US012621888B2

(12) United States Patent
Min et al.

(10) Patent No.: US 12,621,888 B2
(45) Date of Patent: May 5, 2026

(54) ELECTRONIC DEVICE FOR WIRELESS LAN COMMUNICATION WITH MULTIPLE EXTERNAL ELECTRONIC DEVICES AND OPERATION METHOD THEREOF

(71) Applicant: SAMSUNG ELECTRONICS CO., LTD., Suwon-si (KR)

(72) Inventors: Hyunkee Min, Suwon-si (KR); Moonsoo Kim, Suwon-si (KR); Junghun Lee, Suwon-si (KR); Minsik Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 742 days.

(21) Appl. No.: 17/973,373

(22) Filed: Oct. 25, 2022

(65) Prior Publication Data

US 2023/0112678 A1     Apr. 13, 2023

Related U.S. Application Data

(63) Continuation of application No. PCT/KR2022/014939, filed on Oct. 5, 2022.

(30) Foreign Application Priority Data

| | | |
|---|---|---|
| Oct. 12, 2021 | (KR) | 10-2021-0135259 |
| Dec. 22, 2021 | (KR) | 10-2021-0185418 |
| Apr. 4, 2022 | (KR) | 10-2022-0041841 |

(51) Int. Cl.
*H04W 76/15* (2018.01)
*H04W 72/0453* (2023.01)

(52) U.S. Cl.
CPC ....... *H04W 76/15* (2018.02); *H04W 72/0453* (2013.01)

(58) Field of Classification Search
CPC . H04W 76/15; H04W 72/0453; H04W 36/14; H04W 48/16; H04W 72/02;
(Continued)

(56) References Cited

U.S. PATENT DOCUMENTS

| | | |
|---|---|---|
| 9,019,898 B2 | 4/2015 | Damodaran |
| 10,432,887 B2 | 10/2019 | Kim et al. |

(Continued)

FOREIGN PATENT DOCUMENTS

| | | |
|---|---|---|
| EP | 2613601 | 4/2015 |
| KR | 10-2015-0124760 | 11/2015 |

(Continued)

OTHER PUBLICATIONS

Extended European Search Report dated Sep. 26, 2024 issued in European Patent Application No. 22881272.3.
(Continued)

*Primary Examiner* — Sharmin Chowdhury
(74) *Attorney, Agent, or Firm* — NIXON & VANDERHYE P.C.

(57) ABSTRACT

Various embodiments of the disclosure provide a method and apparatus for WLAN communication with a plurality of external electronic devices, in an electronic device. An electronic device may include: a memory, a wireless communication circuit, and at least one processor, and the processor is configured to: identify whether a second external electronic device connected to the electronic device for communication via the WLAN is present, based on a first external electronic device connectable to the electronic device via WLAN-based direction communication being retrieved, obtain connection information related to the WLAN communication with the second external electronic device, based on the second external electronic device being present, set, based on the connection information related to
(Continued)

the WLAN communication with the second external electronic device, a frequency band and/or WLAN communication scheme for WLAN communication with the first external electronic device, and perform, based on the set WLAN communication scheme and/or frequency band, WLAN communication with the first external electronic device.

8 Claims, 12 Drawing Sheets

(58) Field of Classification Search
  CPC ..... H04W 76/14; H04W 84/12; H04W 84/18;
                      H04W 88/04; H04W 88/12
  See application file for complete search history.

(56) References Cited

U.S. PATENT DOCUMENTS

| 10,743,358 | B1 | 8/2020 | Mullati et al. |
| 10,936,267 | B2 | 3/2021 | Suga |
| 2013/0176955 | A1 | 7/2013 | Chuch et al. |
| 2015/0312945 | A1 | 10/2015 | Park et al. |
| 2017/0285788 | A1 | 10/2017 | Park et al. |
| 2017/0290091 | A1 | 10/2017 | Berry |
| 2018/0338336 | A1 | 11/2018 | Seo et al. |
| 2019/0053302 | A1 | 2/2019 | Bang et al. |
| 2019/0254085 | A1* | 8/2019 | Venkataraman .. H04W 52/0209 |
| 2019/0261440 | A1 | 8/2019 | Lim et al. |
| 2020/0120453 | A1 | 4/2020 | Kim et al. |
| 2020/0336969 | A1 | 10/2020 | Gan et al. |
| 2021/0153294 | A1 | 5/2021 | Seo et al. |
| 2021/0250907 | A1 | 8/2021 | Morioka et al. |
| 2022/0418025 | A1 | 12/2022 | Kim et al. |
| 2023/0269707 | A1* | 8/2023 | Zhu ................... H04W 72/0453 |
| | | | 370/330 |

FOREIGN PATENT DOCUMENTS

| KR | 10-2016-0036459 | 4/2016 |
| KR | 10-2017-0058597 | 5/2017 |
| KR | 10-2018-0049525 | 5/2018 |
| KR | 10-2019-0016274 | 2/2019 |
| KR | 10-2020-0041662 | 4/2020 |
| KR | 10-2021-0111539 | 9/2021 |

OTHER PUBLICATIONS

Search Report and Written Opinion dated Jan. 18, 2023 issued in International Patent Application No. PCT/KR2022/014939.

* cited by examiner

FIG. 5

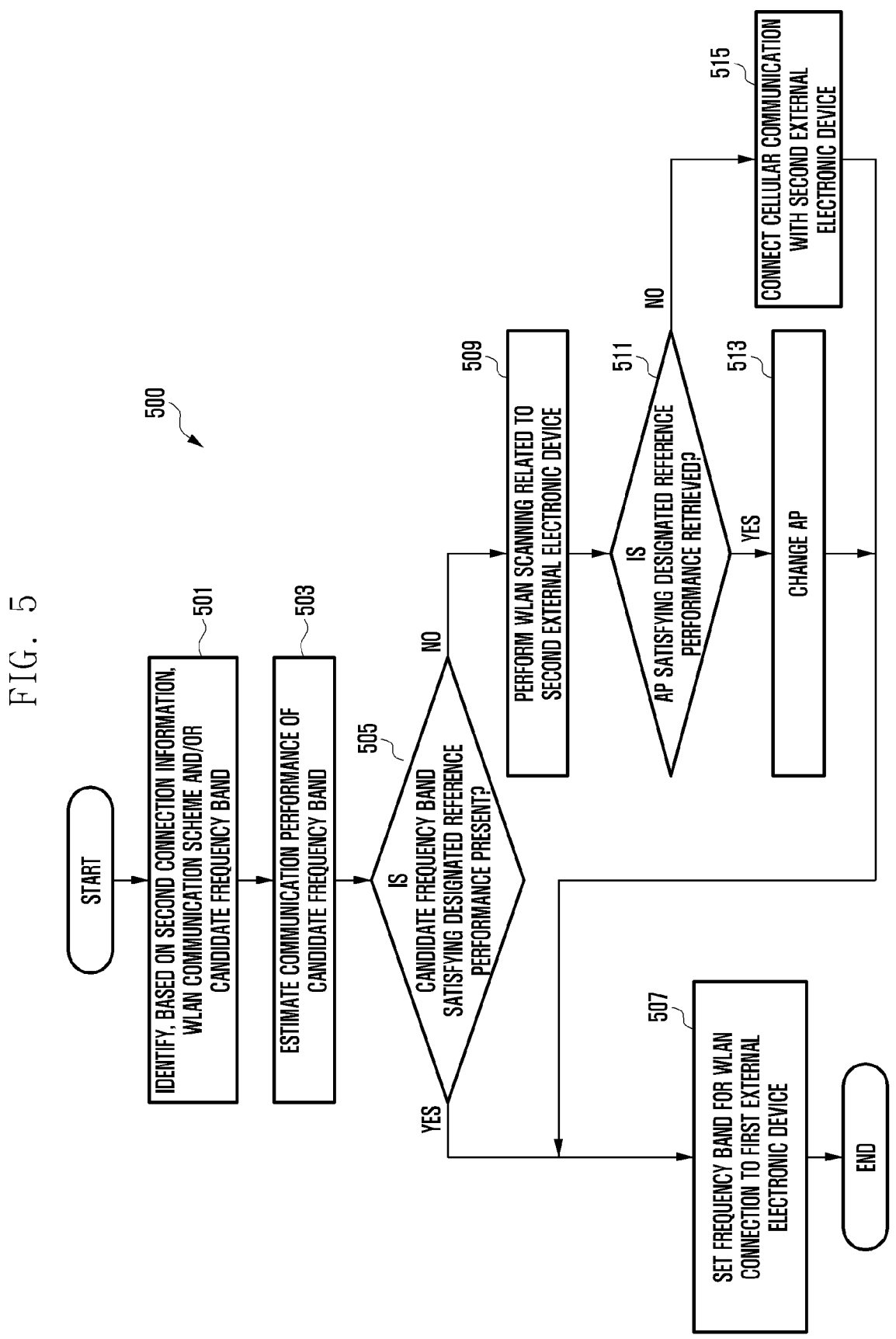

500

START

501 — IDENTIFY, BASED ON SECOND CONNECTION INFORMATION, WLAN COMMUNICATION SCHEME AND/OR CANDIDATE FREQUENCY BAND

503 — ESTIMATE COMMUNICATION PERFORMANCE OF CANDIDATE FREQUENCY BAND

505 — IS CANDIDATE FREQUENCY BAND SATISFYING DESIGNATED REFERENCE PERFORMANCE PRESENT?

NO

YES

507 — SET FREQUENCY BAND FOR WLAN CONNECTION TO FIRST EXTERNAL ELECTRONIC DEVICE

END

509 — PERFORM WLAN SCANNING RELATED TO SECOND EXTERNAL ELECTRONIC DEVICE

511 — IS AP SATISFYING DESIGNATED REFERENCE PERFORMANCE RETRIEVED?

NO

YES

513 — CHANGE AP

515 — CONNECT CELLULAR COMMUNICATION WITH SECOND EXTERNAL ELECTRONIC DEVICE

800

START

801　RELEASE WLAN CONNECTION FROM
SECOND EXTERNAL ELECTRONIC DEVICE

803　IS CHANNEL OF
FIRST EXTERNAL ELECTRONIC DEVICE
CAPABLE OF BEING USED
OUTSIDE?

YES

NO

805　CHANGE CHANNEL FOR WLAN
COMMUNICATION WITH FIRST EXTERNAL
ELECTRONIC DEVICE

END

ELECTRONIC DEVICE FOR WIRELESS LAN COMMUNICATION WITH MULTIPLE EXTERNAL ELECTRONIC DEVICES AND OPERATION METHOD THEREOF

CROSS-REFERENCE TO RELATED APPLICATIONS

This application is a continuation of International Application No. PCT/KR2022/014939 designating the United States, filed on Oct. 5, 2022, in the Korean Intellectual Property Receiving Office and claiming priority to Korean Patent Application No. 10-2021-0135259, filed on Oct. 12, 2021, in the Korean Intellectual Property Office, to Korean Patent Application No. 10-2021-0185418, filed on Dec. 22, 2021, in the Korean Intellectual Property Office, and to Korean Patent Application No. 10-2022-0041841, filed on Apr. 4, 2022, in the Korean Intellectual Property Office, the disclosures of all of which are incorporated by reference herein in their entireties.

BACKGROUND

Field

The disclosure relates to an electronic device and method for wireless LAN communication with a plurality of external electronic devices.

Description of Related Art

A wireless local area network (WLAN) system may support wireless connection of various electronic devices such as a smartphone, a tablet personal computer (PC), or a notebook, using a designated frequency band (e.g., an approximately 2.4 GHz band, an approximately 5 GHz band, and/or an approximately 6 GHz band).

The WLAN system is capable of being installed in public spaces such as airports, train stations, offices, or department stores, in addition to private spaces such as homes.

An electronic device may perform wireless local area network (WLAN) communication with a plurality of external electronic devices. For example, the electronic device may perform WLAN communication with a plurality of external electronic devices based on a real simultaneous dual band (RSDB) scheme, a virtual simultaneous dual band (VSDB) scheme, or a single channel concurrent (SCC) scheme.

In the case of using the VSDB scheme, the electronic device may perform WLAN communication with a first external electronic device via a designated frequency band during a first time interval, and may perform WLAN communication with a second external electronic device via another frequency band that is different from the designated frequency band during a second time interval that is different from the first time interval.

In the case of using the VSDB scheme, the electronic device may perform WLAN communication with external electronic devices during different time intervals, respectively, and thus, latency by WLAN communication may be increased. In the case of the VSDB scheme, the electronic device may be restricted to perform WLAN communication with an external electronic device (e.g., augmented reality glasses) that is relatively sensitive to latency.

SUMMARY

Embodiments of the disclosure provide a method and apparatus for WLAN communication with a plurality of external electronic devices, performed by an electronic device.

According to various example embodiments, an electronic device may include: a memory, a wireless communication circuit configured to support a plurality of frequency bands related to a wireless local area network (WLAN), and at least one processor operatively connected to the memory and the wireless communication circuit, wherein the processor may be configured to: identify whether a second external electronic device connected to the electronic device for communication via the WLAN is present, based on a first external electronic device connectable to the electronic device via WLAN-based direction communication being retrieved, obtain connection information related to the WLAN communication with the second external electronic device, based on the second external electronic device connected for communication via the WLAN being present, set, based on the connection information related to the WLAN communication with the second external electronic device, a frequency band and/or WLAN communication scheme for WLAN communication with the first external electronic device, and perform, based on the set WLAN communication scheme and/or frequency band, WLAN communication with the first external electronic device.

According to various example embodiments, a method of operating an electronic device may include: identifying whether a second external electronic device connected to the electronic device via WLAN for communication is present, based on a first external electronic device connectable to the electronic device via WLAN-based direction communication being retrieved, obtaining connection information related to WLAN communication with a second external electronic device, based on the second external electronic device connected via the WLAN for communication being present, setting a frequency band and/or WLAN communication scheme for WLAN communication with the first external electronic device based on the connection information related to the WLAN communication with the second external electronic device, and performing, based on the set WLAN communication scheme and/or frequency band, WLAN communication with the first external electronic device.

According to various example embodiments, an electronic device may include a memory, a wireless communication circuit configured to support a plurality of frequency bands related to a WLAN, and at least one processor operatively connected to the memory and the wireless communication circuit, wherein the processor is configured to: set a frequency band for WLAN communication with the first external electronic device, based on the first external electronic device connectable to the electronic device via WLAN-based direct communication being retrieved, restrict, based on the setting of the frequency band for the WLAN communication with the first external electronic device, use of at least one frequency band among the plurality of frequency bands capable of being used for WLAN communication with a second external electronic device different from the first external electronic device, and perform, based on the set frequency band, WLAN communication with the first external electronic device.

According to various example embodiments of the disclosure, an electronic device can provide wireless local area network (WLAN) communication based on communication performance that at least one external electronic device needs, by setting a frequency band for WLAN communication with another external electronic device based on connection information related to WLAN communication with an external electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5 is a flowchart illustrating an example of setting of the frequency band of a first external electronic device, performed by an electronic device according to various embodiments;

DETAILED DESCRIPTION

Hereinafter, various example embodiments will be described in greater detail with reference to attached drawings.

Figure 1:
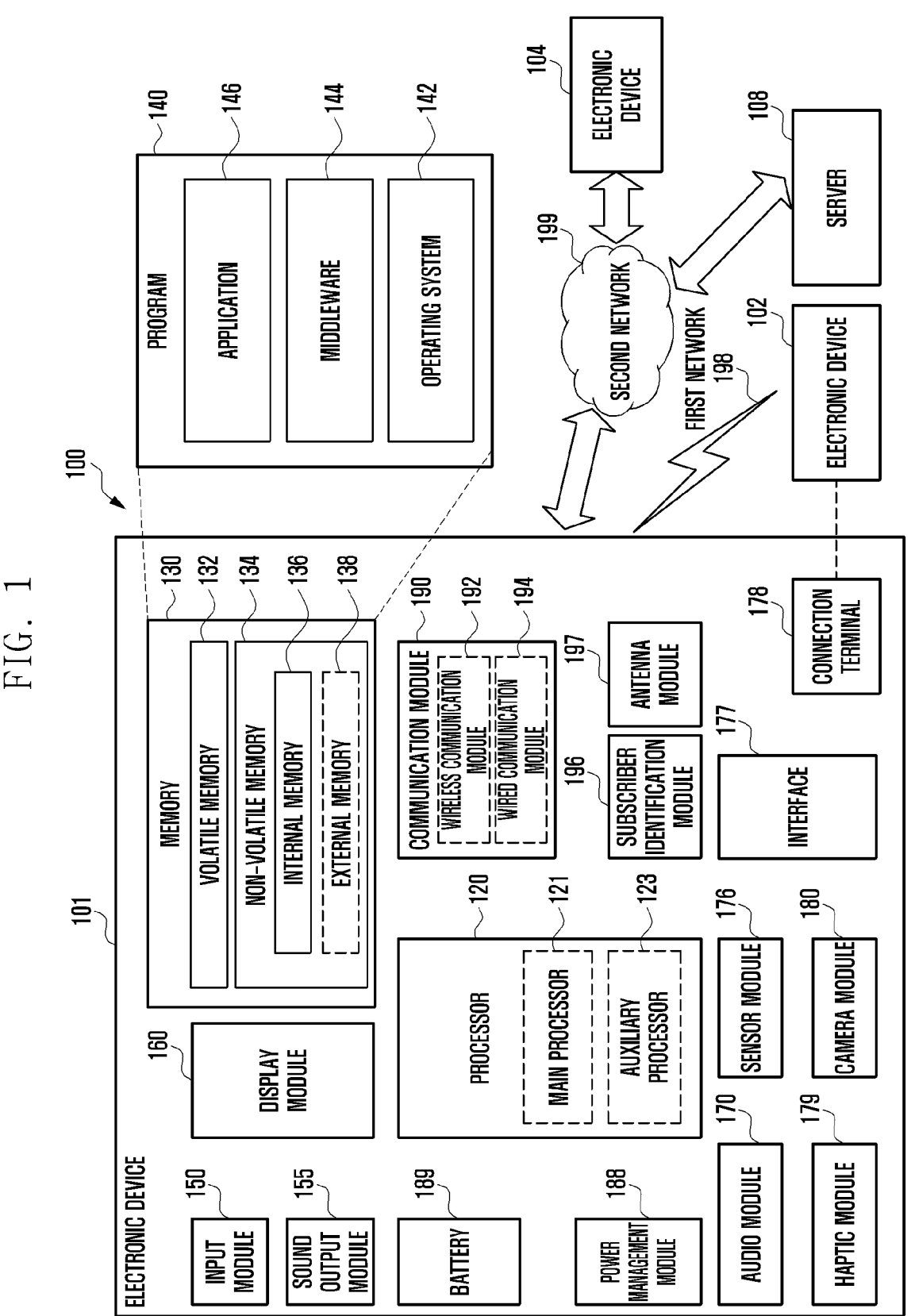
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
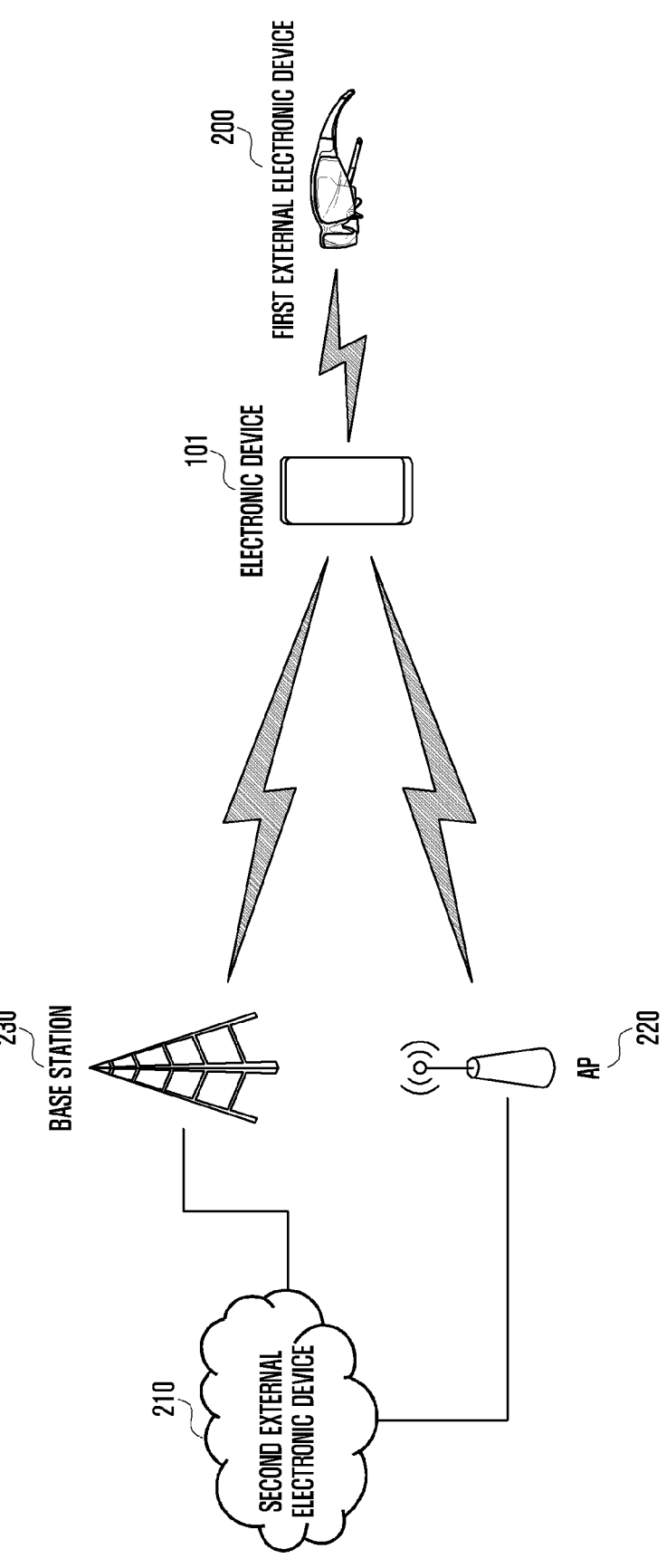
FIG. 2 is a diagram illustrating an example of a wireless communication system for wireless local area network (WLAN) communication with a plurality of external electronic devices according to various embodiments.

FIG. 2 is a diagram illustrating an example of a wireless communication system for wireless local area network (WLAN) communication with a plurality of external electronic devices according to various embodiments.

According to various embodiments with reference to FIG. 2, the electronic device 101 may perform WLAN communication with a first external electronic device 200 via WLAN-based direct communication. According to an embodiment, the electronic device 101 may use an interface related to a software enabled access point (soft AP) for WLAN communication with the first external electronic device 200. The first external electronic device 200 may use an interface related to a station (STA) for WLAN communication with the electronic device 101. According to an embodiment, the electronic device 101 and the first external electronic device 200 may perform WLAN-based direct communication via a peer to peer (P2P) interface. For example, the electronic device 101 may operate in a P2P group owner (P2P GO) mode for direct communication with the first external electronic device 200. The first external electronic device 200 may operate in a P2P group client (P2P GC) mode for direct communication with the electronic device 101. For example, the first external electronic device 200 is a device that performs WLAN-based direct communication with the electronic device 101, and may include a wearable device (e.g., augmented reality glasses).

According to an embodiment, the electronic device 101 may perform data transmission and/or reception with the first external electronic device 200 via direct communication using a designated frequency band among a plurality of frequency bands. For example, the electronic device 101 may transmit, to the first external electronic device 200 via direct communication, information (e.g., an augmented reality image) related to a function (e.g., augmented reality) provided from the first external electronic device 200. For example, the first external electronic device 200 may transmit, to the electronic device 101 via direct communication, an image and/or sensor data obtained from the first external electronic device 200. For example, a plurality of frequency bands may include at least one frequency band among an approximately 2.4 GHz band, an approximately 5 GHz band, or an approximately 6 GHz band.

According to various embodiments, the electronic device 101 may perform communication with a second external electronic device 210 via an access point (AP) 220 that is network infrastructure equipment for WLAN communication or a base station 230 that is network infrastructure equipment for cellular communication. According to an embodiment, the electronic device 101 may perform WLAN communication with the second external electronic device 210 via the AP 220. For example, the electronic device 101 may use an interface related to a station (STA) for WLAN communication with the second external electronic device 210. According to an embodiment, the electronic device 101 may perform cellular communication with the second external electronic device 210 via the base station 230. For example, the second external electronic device 210 is a device that performs WLAN communication with the electronic device 101 via a network infrastructure device (e.g., the AP 220 or the base station 230) for WLAN communication or cellular communication, and may include a server (e.g., a cloud server).

According to various embodiments, based on a real simultaneous dual band (RSDB) scheme, a virtual simultaneous dual band (VSDB) scheme, or a single channel concurrent (SCC) scheme, the electronic device 101 may perform WLAN communication with the first external electronic device 200 and the second external electronic device 210. For example, WLAN communication between the electronic device 101 and the second external electronic device 210 may show a series of operations that the electronic device 101 performs WLAN communication with the second external electronic device 210 via the AP 220. According to an embodiment, in the case of using the RSDB scheme, the electronic device 101 may substantially simultaneously perform WLAN communication with the first external electronic device 200 and the second external electronic device 210 via different frequency bands (e.g., an approximately 2.4 GHz band and an approximately 5 GHz band, an approximately 2.4 GHz band and an approximately 6 GHz band, or an approximately 5 GHz band and an approximately 6 GHz band) using a plurality of communication circuits for WLAN. For example, the electronic device 101 may perform WLAN communication with the first external electronic device 200 via a designated frequency band using a first communication circuit (e.g., a first communication circuit 310 of FIG. 3). For example, using a second communication circuit (e.g., a second communication circuit 320 of FIG. 3), the electronic device 101 may perform WLAN communication with the second external electronic device 210 via a frequency band different from the designated frequency band that is used for the WLAN communication with the first external electronic device 200.

According to an embodiment, in the case of using the VSDB scheme, the electronic device 101 may provide WLAN communication with the first external electronic device 200 and the second external electronic device 210 via different frequency bands (e.g., an approximately 5 GHz band and an approximately 6 GHz band) using a single communication circuit for WLAN. For example, the electronic device 101 may perform WLAN communication with the first external electronic device 200 via a designated frequency band during a first time interval using a communication circuit (e.g., the first communication circuit 310 or the second communication circuit 320 of FIG. 3) that supports WLAN communication. For example, using a communication circuit that supports WLAN communication, the electronic device 101 may perform WLAN communication with the second external electronic device 210 via a frequency band different from the designated frequency band that is used for the WLAN communication with the first external electronic device 200 during a second time interval different from the first time interval.

Figure 3:
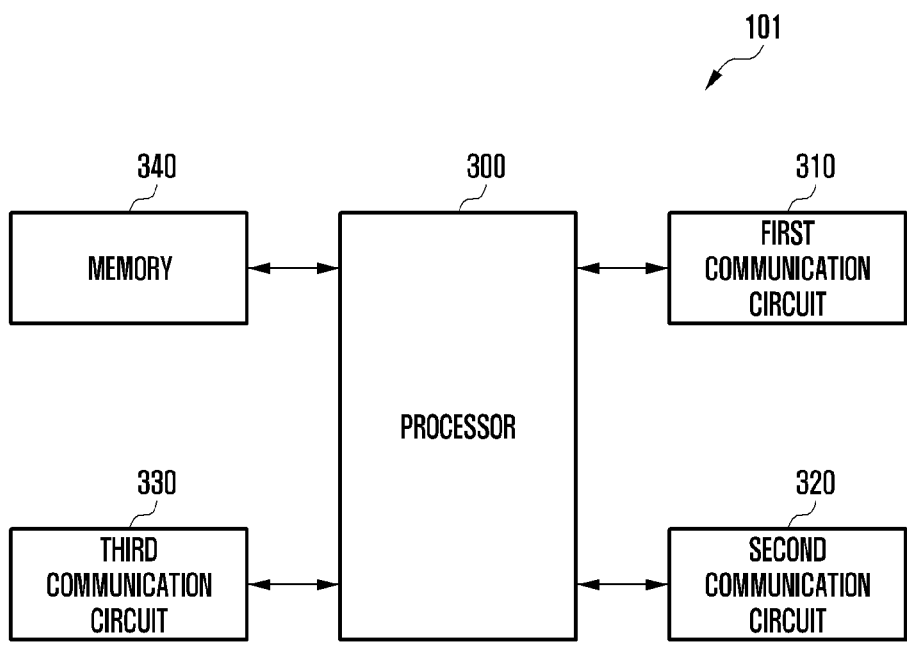
FIG. 3 is a block diagram illustrating an example configuration of an electronic device for WLAN communication with a plurality of external electronic devices according to various embodiments.

According to an embodiment, in the case of using the SCC scheme, the electronic device 101 may provide WLAN communication with the first external electronic device 200 and the second external electronic device 210 via the same WLAN channel using a single communication circuit for WLAN (e.g., the first communication circuit 310 or the second communication circuit 320 of FIG. 3). For example, a WLAN channel may include any one of a plurality of communication channels configured to perform WLAN communication between electronic devices in a designated frequency band for WLAN communication (e.g., an approximately 2.4 GHz band, an approximately 5 GHz band, and/or an approximately 6 GHz band).

FIG. 3 is a block diagram illustrating an example configuration of an electronic device for WLAN communication with a plurality of external electronic devices according to various embodiments.

Referring to FIG. 3, according to various embodiments, the electronic device 101 may include a processor (e.g., including processing circuitry) 300, a first communication circuit 310, a second communication circuit 320, a third communication circuit 330, and/or a memory 340. According to an embodiment, the processor 300 may be substantially the same as the processor 120 of FIG. 1, or may be included in the processor 120. For example, the processor 300 may be embodied as a logical module in the processor 120 of FIG. 1. According to an embodiment, the processor 300 may be embodied as hardware separately from the processor 120 of FIG. 1. According to an embodiment, the first communication circuit 310, the second communication circuit 320, and/or the third communication circuit 330 may be substantially the same as the wireless communication module 192 of FIG. 1, or may be included in the wireless communication module 192. According to an embodiment, the processor 340 may be substantially the same as the processor 130 of FIG. 1, or may be included in the processor 130. According to an embodiment, the processor 300 may be operatively connected to the first communication circuit 310, the second communication circuit 320, the third communication circuit 330, and/or the memory 340.

According to various embodiments, the first communication circuit 310 and the second communication circuit 320 may perform transmission and/or reception of a signal and/or data with at least one external electronic device (e.g., the first external electronic device 200 and/or the second external electronic device 210 of FIG. 2) via wireless local area network (WLAN) communication. According to an embodiment, the first communication circuit 310 and the second communication circuit 320 may be embodied as software that processes protocols and signals of different frequency bands or at least partially different frequency bands. For example, the first communication circuit 310 and the second communication circuit 320 may be divided logically (e.g., software). According to an embodiment, the first communication circuit 310 and the second communication circuit 320 may be embodied as different circuits or different pieces of hardware. For example, WLAN communication may be short-range WLAN communication, and may include Wi-Fi. For example, WLAN communication may be short-range wireless communication defined in the Institute of Electrical and Electronics Engineers (IEEE) 802.11 standard.

According to an embodiment, the first communication circuit 310 may perform transmission and/or reception of a signal and/or data with an external electronic device via a first frequency band (e.g., an approximately 2.4 GHz band) and/or a second frequency band (e.g., an approximately 5 GHz band) of WLAN communication. For example, the first communication circuit 310 may include a radio frequency integrated circuit (RFIC) and/or radio frequency front end (RFFE) for communication with an external electronic device via the first frequency band (e.g., an approximately 2.4 GHz band) and/or the second frequency band (e.g., an approximately 5 GHz band) of WLAN communication.

According to an embodiment, the second communication circuit 320 may perform transmission and/or reception of a signal and/or data with an external electronic device via the second frequency band (e.g., an approximately 5 GHz band)

and/or a third frequency band (e.g., an approximately 6 GHz band) of WLAN communication. For example, the second communication circuit 320 may include an RFIC and/or RFFE for communication with an external electronic device via the second frequency band (e.g., an approximately 5 GHz band) and/or the third frequency band (e.g., an approximately 6 GHz band) of WLAN communication.

According to various embodiments, the third communication circuit 330 may perform transmission and/or reception of a signal and/or data with at least one external electronic device (e.g., the second external electronic device 210 of FIG. 2) via cellular communication. According to an embodiment, the third communication circuit 330 may include an RFIC and/or RFFE for cellular communication. For example, the cellular communication may include wireless communication using a 2G network (e.g., global system for mobile communications (GSM)), a 3G network (e.g., universal mobile telecommunications system (UMTS)), a 4G network (e.g., long-term evolution (LTE)) and/or a 5G network (e.g., new radio (NR)).

According to various embodiments, based on connection information related to WLAN communication with the second external electronic device 210, the processor 300 may include various processing circuitry and configure connection information related to WLAN communication with the first external electronic device 200. According to an embodiment, in the case in which the first external electronic deice 200 that is connectable to the electronic device 101 is detected, the processor 300 may identify whether the second external electronic device 210 connected to the electronic device 101 via WLAN communication is present. For example, the processor 300 may identify whether the first external electronic device 200 is present that is connectable to the electronic device 101 via short-range communication using the first communication circuit 310, the second communication circuit 320, and/or a separate short-range communication circuit (not illustrated). For example, the short-range communication may include at least one of near field communication (NFC), Bluetooth, Bluetooth low energy (BLE), ultra-wideband (UWB), or WLAN (e.g., Wi-Fi). For example, the processor 300 may identify whether the first external electronic device 200 that is connectable to the electronic device 101 is present via quick response (QR) code recognition. For example, connection information related to WLAN communication may include a frequency band and/or WLAN communication scheme for WLAN communication with the electronic device 101. For example, the WLAN communication scheme is a scheme for providing WLAN communication with a plurality of external electronic devices, and may include at least one of an RSDB scheme, a VSDB scheme, or an SCC scheme.

According to an embodiment, when it is determined that the second external electronic device 210 connected to the electronic device 101 via WLAN communication is present, the processor 300 may set, based on the connection information related to WLAN communication with the second external electronic device 210, a candidate frequency band for each WLAN communication scheme for WLAN communication with the first external electronic device 200. The processor 300 may set a candidate frequency band that satisfies communication performance related to the WLAN communication of the electronic device 101 from among the candidate frequency bands of respective WLAN communication schemes, as the WLAN communication scheme and/or frequency band for WLAN communication with the first external electronic device 200. For example, the communication performance related to the WLAN communication of the electronic device 101 may be determined (or calculated) based on the amount of data needed by each external electronic device (e.g., the first external electronic device 200 or the second external electronic device 210) that performs WLAN communication with the electronic device 101, and the bandwidth for WLAN communication with each external electronic device. For example, when it is determined that a candidate frequency band that satisfies communication performance related to the WLAN communication of the electronic device 101 is not present among the candidate frequency bands of respective WLAN communication schemes, the processor 300 may control the first communication circuit 310, the second communication circuit 320, and/or the third communication circuit 330 so as to change the wireless connection to the second external electronic device 210 to cellular communication. For example, based on the change of the second external electronic device 210 to the cellular communication, the processor 300 may configure connection information related to WLAN communication with the first external electronic device 200 based on a function related to WLAN communication supportable by the electronic device 101.

According to an embodiment, when it is determined that the second external electronic device 210 connected to the electronic device 101 via WLAN communication is not present, the processor 300 may configure, based on a function (capability) related to WLAN communication supportable by the electronic device 101, connection information (e.g., a frequency band) related to WLAN communication with the first external electronic device 200. For example, the processor 300 may set, as a frequency band for WLAN communication with the first external electronic device 200, a frequency band that satisfies communication performance (or a communication quality) that the first external electronic device 200 needs among WLAN frequency bands supportable by the electronic device 101. For example, the communication performance that the first external electronic device 200 needs may be determined (or calculated) based on a service quality (e.g., latency and/or the amount of data) that the first external electronic device 200 needs via WLAN communication with the electronic device 101.

According to an embodiment, based on the connection information related to WLAN communication with the first external electronic device 200, the processor 300 may control the first communication circuit 310 and/or the second communication circuit 320 so as to connect WLAN communication with the first external electronic device 200.

According to various embodiments, based on the connection information related to WLAN communication with the first external electronic device 200, the processor 300 may configure (or update) the connection information related to WLAN communication with the second external electronic device 210. According to an embodiment, in the case in which the first external electronic device 200 connectable to the electronic device 101 is detected, the processor 300 may configure, based on a function (capability) related to WLAN communication supportable by the first external electronic device 200, connection information (e.g., a frequency band) related to WLAN communication with the first external electronic device 200.

According to an embodiment, based on the connection information (e.g., a frequency band) related to WLAN communication with the first external electronic device 200, the processor 300 may deactivate at least one frequency band among a plurality of frequency bands capable of being used for WLAN communication with the second external electronic device 210. For example, based on the connection information (e.g., a frequency band) related to WLAN communication with the first external electronic device 200, the processor 300 may identify a WLAN communication scheme capable of being used for WLAN communication with the second external electronic device 210. Based on the connection information (e.g., a frequency band) related to WLAN communication with the first external electronic device 200 and the WLAN communication scheme for WLAN communication with the second external electronic device 210, the processor 300 may identify (or select) at least one frequency band to be deactivated from among a plurality of frequency bands capable of being used for WLAN communication with the second external electronic device 210. The processor 300 may control the first communication circuit 310 and/or the second communication circuit 320 so as to restrict at least one frequency band selected to be deactivated from being used for WLAN communication with the second external electronic device 210. For example, the deactivation of the frequency band may include a series of operations that restrict at least one of searching (search or scan), measurement, or roaming performed on the deactivated frequency band.

According to an embodiment, based on the connection information (e.g., a frequency band) related to WLAN communication with the first external electronic device 200, the processor 300 may determine whether WLAN communication with the first external electronic device 200 and the second external electronic device 210 is supportable. For example, when it is determined that WLAN communication with the first external electronic device 200 and the second external electronic device 210 is supportable, the processor 300 may set (or update), based on the connection information (e.g., a frequency band) related to WLAN communication with the first external electronic device 200, a WLAN communication scheme and/or frequency band for WLAN communication with the second external electronic device 210. For example, when it is determined that the WLAN communication with the first external electronic device 200 and the second external electronic device 210 is not supportable, the processor 300 may control the first communication circuit 310, the second communication circuit 320, and/or the third communication circuit 330 so as to change the wireless connection to the second external electronic device 210 to cellular communication.

According to an embodiment, in the case in which the second external electronic deice 210 for wireless connection to the electronic device 101 is identified, the processor 300 may identify whether the first external electronic device 200 connected to the electronic device 101 via WLAN communication is present. According to an embodiment, when it is determined that the first external electronic device 200 connected to the electronic device 101 via WLAN communication is present, the processor 300 may determine, based on the connection information (e.g., a frequency band) related to WLAN communication with the first external electronic device 200, whether WLAN communication with the first external electronic device 200 and the second external electronic device 210 is supportable. For example, when it is determined that WLAN communication with the first external electronic device 200 and the second external electronic device 210 is supportable, the processor 300 may set, based on the connection information (e.g., a frequency band) related to WLAN communication with the first external electronic device 200, a WLAN communication scheme and/or frequency band for WLAN communication with the second external electronic device 210. For example, when it is determined that the WLAN communication with the first external electronic device 200 and the second external electronic device 210 is not supportable according to an RSDB scheme, a VSDB scheme, and/or an SCC scheme, the processor 300 may control the first communication circuit 310, the second communication circuit 320, and/or the third communication circuit 330 so as to change the wireless connection to the second external electronic device 210 to cellular communication.

According to an embodiment, based on the connection information related to WLAN communication with the second external electronic device 210, the processor 300 may control the first communication circuit 310 and/or the second communication circuit 320 so as to connect WLAN communication with the second external electronic device 210. For example, based on the connection information related to WLAN communication with the second external electronic device 210, the processor 300 may control the first communication circuit 310 and/or the second communication circuit 320 so as to access the AP 220.

According to various embodiments, based on releasing of the WLAN connection to the second external electronic device 210, the processor 300 may update the connection information for WLAN communication with the first external electronic device 200. According to an embodiment, in the case in which the WLAN connection to the second external electronic device 210 is released, the processor 300 may determine that the electronic device 101 moves outside. When it is determined that the electronic device 101 moves outside, the processor 300 may determine whether a channel for WLAN communication with the first external electronic device 200 is available outside. For example, when it is determined that the channel for WLAN communication with the first external electronic device 200 is capable of being used outside, the processor 300 may control the first communication circuit 310 and/or the second communication circuit 320 so as to maintain use of the channel for WLAN communication with the first external electronic device 200. For example, when it is determined that the use of the channel for WLAN communication with the first external electronic device 200 outside is restricted, the processor 300 may control the first communication circuit 310 and/or the second communication circuit 320 so as to change the channel for the WLAN communication with the first external electronic device 200 to a channel that is capable of being used outside.

According to an embodiment, in the case in which the WLAN connection to the second external electronic device 210 is released, the processor 300 may identify whether communication performance for the WLAN communication with the first external electronic device 200, which has been changed based on the release of the WLAN connection from the second external electronic device 210, satisfies a designated reference performance. When it is determined that the communication performance for WLAN communication with the first external electronic device 200 does not satisfy the designated reference performance, the processor 300 may control the first communication circuit 310 and/or the second communication circuit 320 so as to change the channel for the WLAN communication with the first external electronic device 200 to a channel that is capable of satisfying the designated reference performance. For example, when it is determined that the quality of WLAN communication with the first external electronic device 200 performed via the first frequency band (e.g., an approximately 2.4 GHz band) or the second frequency band (e.g., an approximately 5 GHz band) does not satisfy the designated reference performance due to interference from surroundings, the processor 300 may control the first communication circuit 310 and/or second communication circuit 320 so as to change the channel for WLAN communication with the first external electronic device 200 to the channel of the third frequency band (e.g., an approximately 6 GHz band).

According to various embodiments, the memory 340 may store various data used by at least one element (e.g., the processor 300, the first communication circuit 310, the second communication circuit 320, and/or the third communication circuit 330) of the electronic device 101. According to an embodiment, the memory 340 may store various instructions executable by the processor 300.

According to various embodiments, an example electronic device (e.g., the electronic device 101 of FIG. 1, FIG. 2, or FIG. 3), may include a memory (e.g., the memory 130 of FIG. 1 or the memory 340 of FIG. 3), a wireless communication circuit (e.g., the wireless communication module 192 of FIG. 1, or the first communication circuit 310 or the second communication circuit 320 of FIG. 3) configured to support a plurality of frequency bands related to a wireless local area network (WLAN), and at least one processor (e.g., the processor 120 of FIG. 1 or the processor 300 of FIG. 3) operatively connected to the memory and the wireless communication circuit, and the processor may be configured to: identify whether a second external electronic device connected to the electronic device for communication via the WLAN is present, based on a first external electronic device connectable to the electronic device via WLAN-based direction communication being retrieved, obtain connection information related to the WLAN communication with the second external electronic device, based on the second external electronic device connected for communication via the WLAN being present, set, based on the connection information related to the WLAN communication with the second external electronic device, a frequency band and/or WLAN communication scheme for WLAN communication with the first external electronic device, and perform, based on the set WLAN communication scheme and/or frequency band, WLAN communication with the first external electronic device.

According to various example embodiments, the processor may be configured to: select, based on the connection information related to the WLAN communication with the second external electronic device, at least one WLAN communication scheme capable of being used for WLAN communication with the first external electronic device and a candidate frequency band related to each WLAN communication scheme, estimate a communication performance of the candidate frequency band related to the each WLAN communication scheme, and select, based on the estimated communication performance, a WLAN communication scheme and frequency band for WLAN communication with the first external electronic device.

According to various example embodiments, the processor may be configured to: select, based on a frequency band related to WLAN communication with the second external electronic device, a candidate frequency band associated with each WLAN communication scheme and the WLAN communication scheme for a WLAN connection to the first external electronic device.

According to various example embodiments, the processor may be configured to: identify a first service section related to the candidate frequency band of the each WLAN communication scheme, identify a second service section for WLAN communication with the second external electronic device, identify, based on the first service section and the second service section, a candidate frequency band that satisfies a designated reference performance, and select the candidate frequency band that satisfies the designated reference performance as the frequency band for WLAN communication with the first external electronic device.

According to various example embodiments, the first service section may be set based on a bandwidth of the candidate frequency band of the each WLAN communication scheme and/or an amount of data needed for WLAN communication with the first external electronic device, and the second service section may be set based on a bandwidth of a frequency band for WLAN communication with the second external electronic device and/or an amount of data needed for WLAN communication with the second external electronic device.

According to various example embodiments, based on a candidate frequency band that satisfies the designated reference performance not being present, the processor may be configured to change a wireless connection to the second external electronic device to a cellular network.

According to various example embodiments, based on a candidate frequency band that satisfies the designated reference performance not being present, the processor may be configured to: perform WLAN scanning related to the second external electronic device, identify a candidate frequency band that satisfies the designated reference performance based on a WLAN scan result, and select the candidate frequency band that satisfies the designated reference performance as the frequency band for WLAN communication with the first external electronic device.

According to various example embodiments, the processor may be configured to change, based on a WLAN scan result, an access point (AP) for a wireless connection to the second external electronic device.

According to various example embodiments, based on a candidate frequency band that satisfies the designated reference performance being identified as not being present based on the WLAN scan result, the processor may be configured to change the wireless connection to the second external electronic device to a cellular network.

According to various example embodiments, the WLAN communication scheme may include at least one of real simultaneous dual band (RSDB), virtual simultaneous dual band (VSDB), and single channel concurrent (SCC).

According to various example embodiments, an electronic device (e.g., the electronic device 101 of FIG. 1, FIG. 2, or FIG. 3) may include a memory (e.g., the memory 130 of FIG. 1, or the memory 340 of FIG. 3), a wireless communication circuit (e.g., the wireless communication module 192 of FIG. 1, or the first communication circuit 310 or the second communication circuit 320 of FIG. 3) configured to support a plurality of frequency bands related to a WLAN, and at least one processor (e.g., the processor 120 of FIG. 1 or the processor 300 of FIG. 3) operatively connected to the memory and the wireless communication circuit, and the processor may be configured to: set a frequency band for WLAN communication with the first external electronic device, based on the first external electronic device connectable to the electronic device via WLAN-based direct communication being retrieved, restrict, based on the setting of the frequency band for the WLAN communication with the first external electronic device, use of at least one frequency band among the plurality of frequency bands capable of being used for WLAN communication with a second external electronic device different from the first external electronic device, and perform, based on the set frequency band, WLAN communication with the first external electronic device.

According to various example embodiments, the processor may be configured to: identify a WLAN connection scheme capable of being used for a WLAN connection to the second external electronic device, identify at least one frequency band of which use is to be restricted based on a frequency band for a WLAN connection to the first external electronic device and the WLAN connection scheme capable of being used for the WLAN connection to the second external electronic device, and restrict use of the at least one identified frequency band from among the plurality of frequency bands capable of being used for WLAN communication with the second external electronic device.

According to various example embodiments, the processor may be configured to change an access point (AP) for a wireless connection to the second external electronic device, based on use of a frequency band that is being used for WLAN communication with the second external electronic device via the WLAN being restricted.

Figure 4:
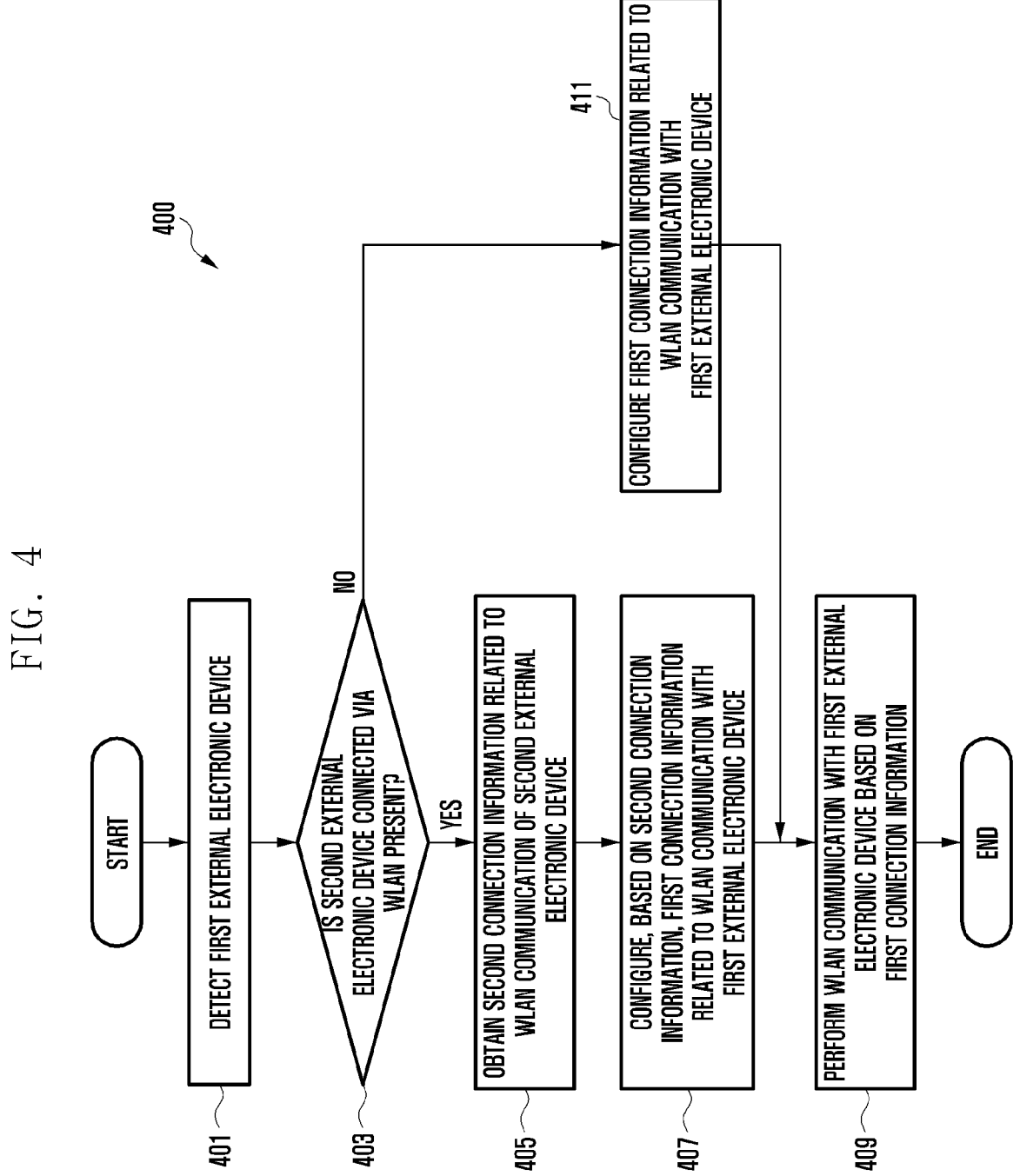
FIG. 4 is a flowchart illustrating example WLAN communication with a plurality of external electronic devices, performed by an electronic device according to various embodiments.

FIG. 4 is a flowchart 400 illustrating example WLAN communication with a plurality of external electronic devices, performed by an electronic device according to various embodiments. In an embodiment provided hereinafter, operations may be performed sequentially, but they are not necessarily performed sequentially. For example, the order of operations may be changed, and at least two operations may be performed in parallel. For example, the electronic device of FIG. 4 may be the electronic device 101 of FIG. 1, FIG. 2, or FIG. 3.

According to various embodiments with reference to FIG. 4, the electronic device 101 or a processor (e.g., the processor 120 of FIG. 1 or the processor 300 of FIG. 3) may detect the first external electronic device 200 connectable to the electronic device 101 via WLAN-based direct communication in operation 401. According to an embodiment, the processor 300 may identify whether the first external electronic device 200 is present that is connectable to the electronic device 101 using direct communication via short-range communication using the first communication circuit 310, the second communication circuit 320, and/or a separate short-range communication circuit (not illustrated). For example, the short-range communication may include an NFC, Bluetooth, BLE, and/or WLAN (e.g., Wi-Fi). According to an embodiment, via QR code recognition, the processor 300 may identify whether the first external electronic device 200 that is connectable to the electronic device 101 via direct communication is present.

According to various embodiments, the electronic device 101 or the processor (e.g., the processor 120 or 300) may identify whether the second external electronic device 210 is present that has a WLAN communication connection to the electronic device 101 in operation 403. According to an embodiment, the processor 300 may identify whether the electronic device 101 accesses the AP 220 via the first communication circuit 310 and/or the second communication circuit 320. For example, in the case in which the electronic device 101 accesses the AP 220 via the first communication circuit 310 and/or the second communication circuit 320, the processor 300 may determine that the second external electronic device 210 having a WLAN communication connection to the electronic device 101 is present. For example, in the case in which the electronic device 101 does not access the AP 220 via the first communication circuit 310 and/or the second communication circuit 320, the processor 300 may determine that the second external electronic device 210 having a WLAN communication connection to the electronic device 101 is not present.

According to various embodiments, when it is determined that the second external electronic device 210 having a WLAN communication connection to the electronic device 101 is present ('Yes' in operation 403), the electronic device 101 or the processor (e.g., the processor 120 or 300) may obtain second connection information related to WLAN communication with the second external electronic device 210 in operation 405. For example, the second connection information related to WLAN communication with the second external electronic device 210 may include information related to a frequency band for WLAN communication with the second external electronic device 210 and/or information related to a channel for WLAN communication.

According to various embodiments, in operation 407, the electronic device 101 or the processor (e.g., the processor 120 or 300) may configure, based on the second connection information related to the WLAN communication with the second external electronic device 210, first connection information for WLAN communication with the first external electronic device 200. According to an embodiment, based on the second connection information related to WLAN communication with the second external electronic device 210, the processor 300 may set a candidate frequency band for each WLAN communication scheme for WLAN communication with the first external electronic device 200. The processor 300 may set a candidate frequency band that satisfies communication performance related to WLAN communication of the electronic device 101 from among the candidate frequency bands of respective WLAN communication schemes, as a WLAN communication scheme and/or frequency band for WLAN communication with the first external electronic device 200. For example, the communication performance related to the wireless communication of the electronic device 101 may be determined (or calculated) based on the amount of data needed by each external electronic device (e.g., the first external electronic device 200 or the second external electronic device 210) that performs WLAN communication with the electronic device 101, and a bandwidth for WLAN communication with each external electronic device. For example, the first connection information related to WLAN communication with the first external electronic device 200 may include information related to a frequency band for WLAN communication with the first external electronic device 200 and/or a WLAN communication scheme for WLAN communication with the first external electronic device 200. For example, the WLAN communication scheme is a scheme for providing WLAN communication with a plurality of external electronic devices, and may include an RSDB scheme, a VSDB scheme, and/or an SCC scheme.

According to an embodiment, when it is determined that a candidate frequency band that satisfies communication performance related to the WLAN communication of the electronic device 101 is not present among the candidate frequency bands of respective WLAN communication schemes, the processor 300 may control the first communication circuit 310, the second communication circuit 320, and/or the third communication circuit 330 so as to change the wireless connection to the second external electronic device 210 to cellular communication. Upon the change of the second external electronic device 210 to the cellular communication, the processor 300 may configure connection information (e.g., a frequency band) related to the WLAN communication with the first external electronic device 200 based on a function related to WLAN communication supportable by the electronic device 101.

According to various embodiments, when it is determined that the second external electronic device 210 that has a WLAN communication connection to the electronic device 101 is not present ('No' in operation 403), the electronic device 101 or the processor (e.g., the processor 120 or 300) may set, based on a function related to WLAN communication supportable by the electronic device 101, the first connection information (e.g., a frequency band) related to WLAN communication with the first external electronic device 200 in operation 411. According to an embodiment, in the case in which the second external electronic device 210 connected via the WLAN communication is not present, the processor 300 may select a frequency band for WLAN communication with the first external electronic device 200 among frequency bands for WLAN communication supportable by the electronic device 101. For example, the frequency band for WLAN communication with the first external electronic device 200 may include a frequency band that satisfies communication performance that the first external electronic device 200 needs among the frequency bands for WLAN communication supportable by the electronic device 101. For example, the communication performance that the first external electronic device 200 needs may be determined (or calculated) based on a service quality (e.g., latency and/or the amount of data) that the first external electronic device 200 needs via WLAN communication with the electronic device 101.

According to various embodiments, in operation 409, based on the first connection information related to the WLAN communication with the first external electronic device 200, the electronic device 101 or the processor (e.g., the processor 120 or 300) may perform WLAN communication with the first external electronic device 200. According to an embodiment, based on the first connection information (e.g., a frequency band) related to WLAN communication with the first external electronic device 200, the processor 300 may select a channel for WLAN communication with the first external electronic device 200. The processor 300 may control the first communication circuit 310 and/or the second communication circuit 320 so as to perform WLAN communication with the first external electronic device 200 via the channel for the WLAN communication with the first external electronic device 200.

According to an embodiment, in the case of performing WLAN communication with the first external electronic device 200 and the second external electronic device 210, the processor 300 may control the first communication circuit 310 and/or the second communication circuit 320 so as to perform WLAN communication with the first external electronic device 200 and/or the second external electronic device 210 according to a WLAN communication scheme included in the first connection information (e.g., an RSDB scheme, a VSDB scheme, and/or an SCC scheme).

Figure 6:
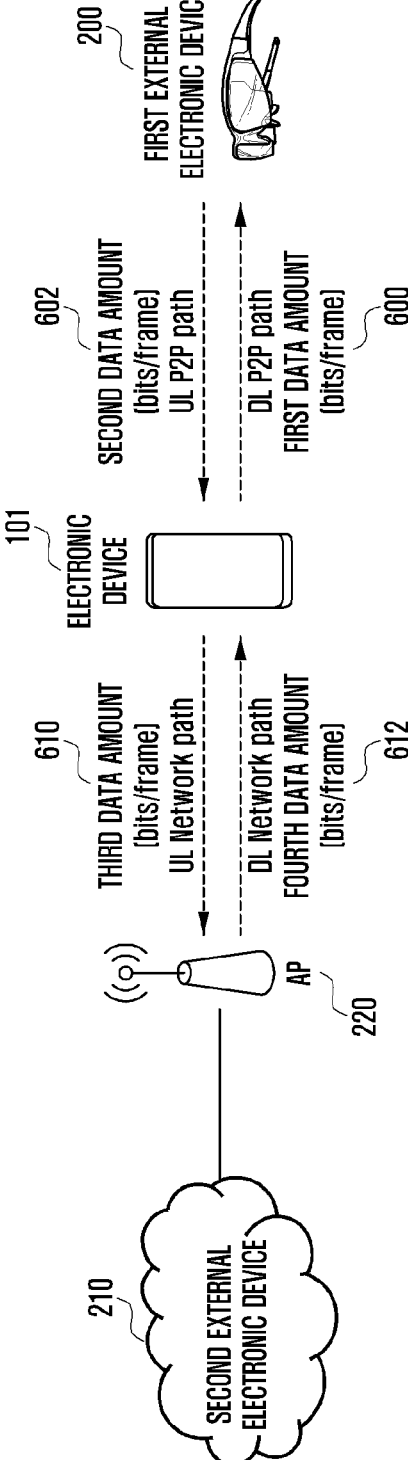
FIG. 6 is a diagram illustrating an example of estimating communication performance by an electronic device according to various embodiments.

FIG. 5 is a flowchart 500 illustrating an example of setting of a frequency band of a first external electronic device by an electronic device according to various embodiments. According to an embodiment, at least a part of FIG. 5 may include detailed operations of operation 407 of FIG. 4. In an embodiment provided hereinafter, operations may be performed sequentially, but they are not necessarily performed sequentially. For example, the order of operations may be changed, and at least two operations may be performed in parallel. For example, the electronic device of FIG. 5 may be the electronic device 101 of FIG. 1, FIG. 2, or FIG. 3. For example, at least a part of FIG. 5 will be described with reference to FIG. 6. FIG. 6 is a diagram illustrating an example of estimating communication performance by an electronic device according to various embodiments.

According to various embodiments with reference to FIG. 5, in the case in which the electronic device 101 or a processor (e.g., the processor 120 of FIG. 1 or the processor 300 of FIG. 3) obtains second connection information for WLAN communication with the second external electronic device 210 that has a WLAN communication connection to the electronic device 101 (e.g., operation 405 of FIG. 4), the electronic device 101 or the processor (e.g., the processor 120 of FIG. 1 or the processor 300 of FIG. 3) may identify a candidate frequency band for each WLAN communication scheme for WLAN communication with the first external electronic device 200 based on connection information (e.g., a frequency band) related to the WLAN communication with the second external electronic device 210 in operation 501. According to an embodiment, in the case of using a third frequency band (e.g., an approximately 6 GHz band) for WLAN communication with the second external electronic device 210, the processor 300 may set a first frequency band (e.g., an approximately 2.4 GHz band) and/or a second frequency band (e.g., an approximately 5 GHz band) as a candidate frequency band according to the RSDB scheme. According to an embodiment, in the case of using the third frequency band (e.g., an approximately 6 GHz band) for WLAN communication with the second external electronic device 210, the processor 300 may set the third frequency band (e.g., an approximately 6 GHz band) as a candidate frequency band according to the SCC scheme. According to an embodiment, in the case of using the third frequency band (e.g., an approximately 6 GHz band) for WLAN communication with the second external electronic device 210, the processor 300 may set the second frequency band (e.g., an approximately 5 GHz band) as a candidate frequency band according to the VSDB scheme.

According to various embodiments, the electronic device 101 or the processor (e.g., the processor 120 or 300) may estimate communication performance of the electronic device 101 related to each candidate frequency band in operation 503. According to an embodiment, the processor 300 may obtain the service period of the first external electronic device 200 based on the bandwidth and the amount of data of a communication link for WLAN communication with the first external electronic device 200. For example, the amount of data of the communication link for the WLAN communication with the first external electronic device 200 may be set based on a first data amount 600 and/or a second data amount 602 that are needed for wireless communication with the first external electronic device 200 via direct communication of FIG. 6. For example, the first data amount 600 may include the amount of data needed for transmission from the electronic device 200 to the first external electronic device 200. For example, the second data amount 602 may include the amount of data needed for transmission from the first external electronic device 200 to the electronic device 200. For example, the bandwidth for WLAN communication with the first external electronic device 200 may be set based on a bandwidth (e.g., approximately 160 MHz) defined in WLAN-based direct communication (e.g., 802.11ax standard), the number of spatial streams for direct communication with the first external electronic device 200, a modulation and coding scheme (MCS) level, and/or an overhead (e.g., transmission control protocol (TCP) overhead) related to WLAN communication with the first external electronic device 200. For example, the service period of the first external electronic device 200 may be determined (or calculated) based on the ratio of the amount of data of a communication link for WLAN communication with the first external electronic device 200 to the bandwidth for WLAN communication with the first external electronic device 200. According to an embodiment, the processor 300 may obtain the service period of the second external electronic device 210 based on the bandwidth and the amount of data of a communication link for WLAN communication with the second external electronic device 210. For example, the amount of data of the communication link for the WLAN communication with the second external electronic device 210 may be set based on a third data amount 610 and/or a fourth data amount 612 that are needed for wireless communication with a network infrastructure device (e.g., the AP 220) of FIG. 6. For example, the third data amount 610 may include the amount of data needed for transmission from the electronic device 200 to the second external electronic device 210 (e.g., the AP 220). For example, the fourth data amount 612 may include the amount of data needed for transmission from the second external electronic device 210 (e.g., the AP 220) to the electronic device 200. For example, the service period of the second external electronic device 210 may be determined (or calculated) based on the ratio of the amount of data of a communication link for WLAN communication with the second external electronic device 210 to the bandwidth (e.g., an uplink bandwidth and/or a downlink bandwidth) for WLAN communication with the second external electronic device 210.

According to various embodiments, the electronic device 101 or the processor (e.g., the processor 120 or 300) may identify whether a candidate frequency band that satisfies a designated reference performance is present in operation 505. According to an embodiment, the designated reference performance may be set based on a WLAN communication scheme. For example, in the case in which the transmission period of a first candidate frequency band of the RSDB scheme is greater than or equal to the service period of the first external electronic device 200 and the service period of the second external electronic device 210, that the processor 300 may determine that the first candidate frequency band according to the RSDB scheme satisfies the designated reference performance. For example, in the case in which the transmission period of the first candidate frequency band of the RSDB scheme is less than the service period of the first external electronic device 200 or the service period of the second external electronic device 210, that the processor 300 determines that the first candidate frequency band according to the RSDB scheme does not satisfy the designated reference performance. For example, the transmission period may be set based on a frame rate of a function provided via the first external electronic device 200.

For example, in the case in which the transmission period of a second candidate frequency band of the SCC scheme is greater than or equal to the sum of the service period of the first external electronic device 200 and the service period of the second external electronic device 210, the processor 300 may determine that the second candidate frequency band according to the SCC scheme satisfies the designated reference performance. For example, in the case in which the transmission period of the second candidate frequency band of the SCC scheme is less than the sum of the service period of the first external electronic device 200 and the service period of the second external electronic device 210, the processor 300 may determine that the second candidate frequency band according to the SCC scheme does not satisfy the designated reference performance.

For example, in the case in which the transmission period of a third candidate frequency band of the VSDB scheme is greater than or equal to the sum of the service period of the first external electronic device 200, the service period of the second external electronic device 210, and a period of time related to channel switch, that the processor 300 may determine that the third candidate frequency band according to the VSDB scheme satisfies the designated reference performance. For example, in the case in which the transmission period of the third candidate frequency band of the VSDB scheme is less than the sum of the service period of the first external electronic device 200, the service period of the second external electronic device 210, and a period of time related to channel switch, that the processor 300 may determine that the third candidate frequency band according to the VSDB scheme does not satisfy the designated reference performance. For example, the period of time related to channel switch may include information related to a period of time needed when the electronic device 101 changes from WLAN communication with the first external electronic device 200 using the first frequency band to WLAN communication with the second external electronic device 210 using the second frequency band.

According to various embodiments, in the case in which a candidate frequency band that satisfies the designate reference performance is present (e.g., 'Yes' in operation 505), the electronic device 101 or the processor (e.g., the processor 120 or 300) may set the candidate frequency band that satisfies the designated reference performance as a frequency band for WLAN communication with the first external electronic device 200 in operation 507.

According to various embodiments, in the case in which a candidate frequency band that satisfies the designate reference performance is not present (e.g., 'No' in operation 505), the electronic device 101 or the processor (e.g., the processor 120 or 300) may perform WLAN scanning related to the second external electronic device 210 in operation 509. According to an embodiment, in the case in which a candidate frequency band selected based on the second connection information related to the WLAN communication with the second external electronic device 210 does not satisfy the designated reference performance, the processor 300 may perform WLAN scanning in order to identify whether another AP is present that the electronic device 101 is capable of accessing for WLAN communication with the second external electronic device 210.

According to various embodiments, the electronic device 101 or the processor (e.g., the processor 120 or 300) may identify whether another AP that satisfies a designated reference performance is retrieved via WLAN scanning, in operation 511. According to an embodiment, in the case in which another AP that the electronic device 101 is capable of accessing for WLAN communication with the second external electronic device 210 is not retrieved, the processor 300 may determine that another AP that satisfies the designated reference performance is not retrieved. For example, another AP may include at least one other AP that the electronic device 101 is capable of accessing, excluding an AP that the electronic device 101 accesses for WLAN communication with the second external electronic device 210.

According to an embodiment, in the case in which another AP is retrieved that the electronic device 101 is capable of accessing for WLAN communication with the second external electronic device 210, the processor 300 may estimate, based on a frequency band for WLAN communication with the other AP, communication performance of the electronic device 101 related to each candidate frequency band. For example, based on the determination indicating that a candidate frequency band that satisfies the designated reference performance is not present in operation 505, the processor 300 may exclude the first frequency band (e.g., approximately 2.4 GHz) from a candidate frequency band. Accordingly, based on the frequency band for WLAN communication with the other AP, the processor 300 may estimate communication performance of the electronic device 101 related to candidate frequency bands remaining after excluding the first frequency band (e.g., approximately 2.4 GHz). According to an embodiment, the processor 300 may identify whether a candidate frequency band that satisfies the designated reference performance is present based on communication performance of a candidate frequency band estimated based on the frequency band for WLAN communication with the other AP. For example, in the case in which the candidate frequency band that satisfies the designated reference performance is present, the processor 300 may determine that another AP that satisfies the designated reference performance is retrieved. For example, in the case in which the candidate frequency band that satisfies the designated reference performance is not present, the processor 300 may determine that another AP that satisfies the designated reference performance is not retrieved.

According to various embodiments, in the case in which another AP that satisfies the designate reference performance is retrieved (e.g., 'Yes' in operation 511), the electronic device 101 or the processor (e.g., the processor 120 or 300) may change an AP for WLAN communication with the second external electronic device 210 to the other AP that satisfies the designated reference performance in operation 513.

According to various embodiments, upon the change of the AP for WLAN communication with the second external electronic device 210, the electronic device 101 or the processor (e.g., the processor 120 or 300) may set a candidate frequency band that satisfies the designated reference performance as a frequency band for WLAN communication with the first external electronic device 200 in operation 507.

According to various embodiments, in the case in which another AP that satisfies the designate reference performance is not retrieved (e.g., 'No' in operation 511), the electronic device 101 or the processor (e.g., the processor 120 or 300) may change wireless communication with the second external electronic device 210 to cellular communication in operation 515.

According to various embodiments, in operation 507, the electronic device 101 or the processor (e.g., the processor 120 or 300) may set a frequency band for WLAN communication with the first external electronic device 200 based on a connection to the cellular communication with the second external electronic device 210. According to an embodiment, the processor 300 may set, as a frequency band for WLAN communication with the first external electronic device 200, a frequency band that satisfies communication performance that the first external electronic device 200 needs among WLAN frequency bands supportable by the electronic device 101. For example, the communication performance that the first external electronic device 200 needs may be determined (or calculated) based on a service quality (e.g., latency and/or the amount of data) that the first external electronic device 200 needs via WLAN communication with the electronic device 101.

According to various embodiments, in the case in which a plurality of candidate frequency bands that satisfy the designated reference performance is present, the electronic device 101 may set a frequency band for WLAN communication with the first external electronic device 200 from among the plurality of candidate frequency bands that satisfy the designated reference performance based on the communication performance that the first external electronic device 200 needs. According to an embodiment, for each of the plurality of candidate frequency bands that satisfy the designated reference performance, the processor 300 may estimate communication performance for WLAN communication with the first external electronic device 200. The processor 300 may set a candidate frequency band having the best communication performance for WLAN communication with the first external electronic device 200 as the frequency band for WLAN communication with the first external electronic device 200. According to an embodiment, the processor 300 may set a candidate frequency band having the highest frequency band among the plurality of candidate frequency bands that satisfy the designated reference performance, as a frequency band for WLAN communication with the first external electronic device 200. For example, the processor 300 may select the frequency band for WLAN communication with the first external electronic device 200 in order of an approximately 6 GHz band, an approximately 5 GHz band, and an approximately 2.4 GHz band. According to an embodiment, based on the service quality (e.g., latency and/or the amount of data) that the first external electronic device 200 needs, the processor 300 may set a frequency band for WLAN communication with the first external electronic device 200. For example, the processor 300 may select the frequency band for WLAN communication with the first external electronic device 200 in order of a candidate frequency band based on the RSDB scheme, a candidate frequency band based on the SCC scheme, and a candidate frequency band based on the VSDB scheme.

According to various embodiments, in the case in which the electronic device 101 determines that a candidate frequency band that satisfy a designated reference quality is not present (e.g., 'No' in operation 505) among candidate frequency bands for respective WLAN communication schemes set based on the frequency band for WLAN communication with the second external electronic device 210, the electronic device 101 may change the wireless communication with the second external electronic device 210 to cellular communication. According to an embodiment, in the case in which a candidate frequency band that satisfies the designated reference performance is not present (e.g., 'No' in operation 505), the processor 300 may change the wireless communication with the second external electronic device 210 to cellular communication in operation 515. For example, operations 509 to 513 of FIG. 5 may be omitted.

Figure 7:
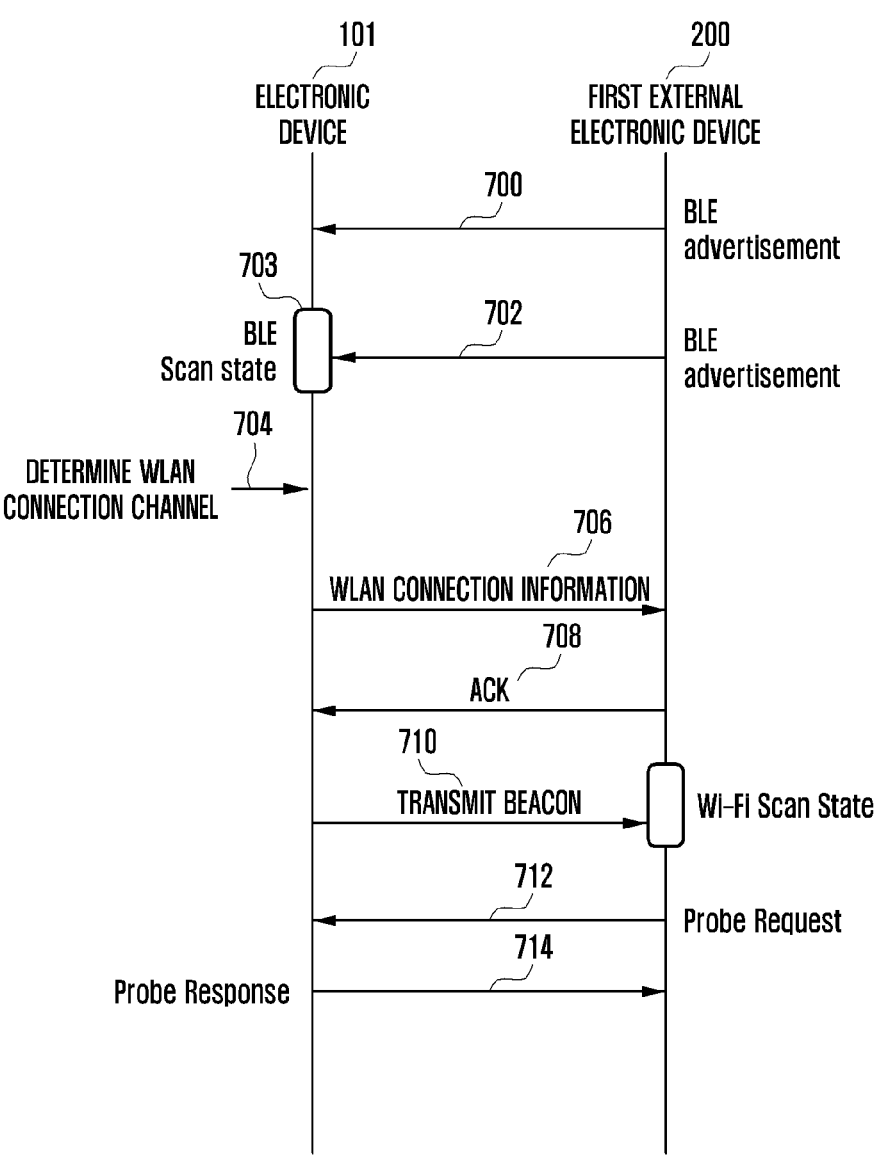
FIG. 7 is a signal flow diagram illustrating an example of WLAN communication with a first external electronic device by an electronic device according to various embodiments.

FIG. 7 is a signal flow diagram illustrating an example of WLAN communication with a first external electronic device by an electronic device according to various embodiments.

According to various embodiments with reference to FIG. 7, the first external electronic device 200 may transmit (or broadcast) a discovery request message (e.g., BLE advertisement) so that the electronic device 101 adjacent to the first external electronic device 200 may recognize the existence of the first external electronic device 200 in operation 700 and operation 702. For example, the discovery request message may be periodically transmitted. For example, the discovery request message may include identification information of the first external electronic device 200.

According to various embodiments, in the case in which the discovery request message is received, the electronic device 101 may determine that the first external electronic device 200 capable of performing direct communication with the electronic device 101 is present in operation 703. According to an embodiment, in the case in which a scan mode (e.g., BLE scan state) is operated (operation 703), the electronic device 101 may receive a discovery request message.

According to various embodiments, when it is determined that the first external electronic device 200 capable of performing direct communication with the electronic device 101 is present, the electronic device 101 may determine a WLAN connection channel for direct communication with the first external electronic device 200 in operation 704. According to an embodiment, as illustrated in operations 401 to 411 of FIG. 4, the electronic device 101 may set a channel for direct communication with the first external electronic device 200 based on a WLAN.

According to various embodiments, the electronic device 101 may transmit connection information (e.g., WLAN connection information) for direct communication with the first external electronic device 200 based on WLAN to the first external electronic device 200 via short-range communication (e.g., BLE) in operation 706. For example, the connection information (e.g., WLAN connection information) for direct communication with the first external electronic device 200 may include information related to a WLAN connection channel for the direct communication with the first external electronic device 200.

According to various embodiments, the first external electronic device 200 may transmit a response message in response to the WLAN connection information to the electronic device 101 via the short-range communication (e.g., BLE) in operation 708. For example, the response message may include information (e.g., ACK) related to successful reception of the WLAN connection information or information (e.g., NACK) related to failure of reception of the WLAN connection information.

According to various embodiments, in the case in which the information (e.g., ACK) related to successful reception corresponding to the WLAN connection information is received from the first external electronic device 200 in operation 708, the electronic device 101 may transmit a beacon frame to the first external electronic device 200 via the WLAN communication in operation 710. According to an embodiment, the electronic device 101 may transmit a beacon frame via a WLAN connection channel for direct communication with the first external electronic device 200.

According to various embodiments, in the case in which the first external electronic device 200 receives the WLAN connection information from the electronic device 101 in operation 706, the first external electronic device 200 may identify whether a beacon frame is received from the electronic device 101 via WLAN communication. For example, in the case in which the WLAN connection information is received, the first external electronic device 200 may operate in a WLAN scan state. In the WLAN scan state, the first external electronic device 200 may identify whether a beacon frame is received from the electronic device 101 via WLAN communication. In the case in which a beacon frame is received from the electronic device 101, the first external electronic device 200 may transmit a probe request frame to the electronic device 101 in operation 712.

According to various embodiments, the electronic device 101 may transmit a probe response frame to the first external electronic device 200 in response to the probe request frame in operation 714.

According to various embodiments, the electronic device 101 and the first external electronic device 200 may perform an authentication procedure. In the case in which authentication is successfully performed, the electronic device 101 and the first external electronic device 200 may determine that connection of WLAN communication is completed.

Figure 8:
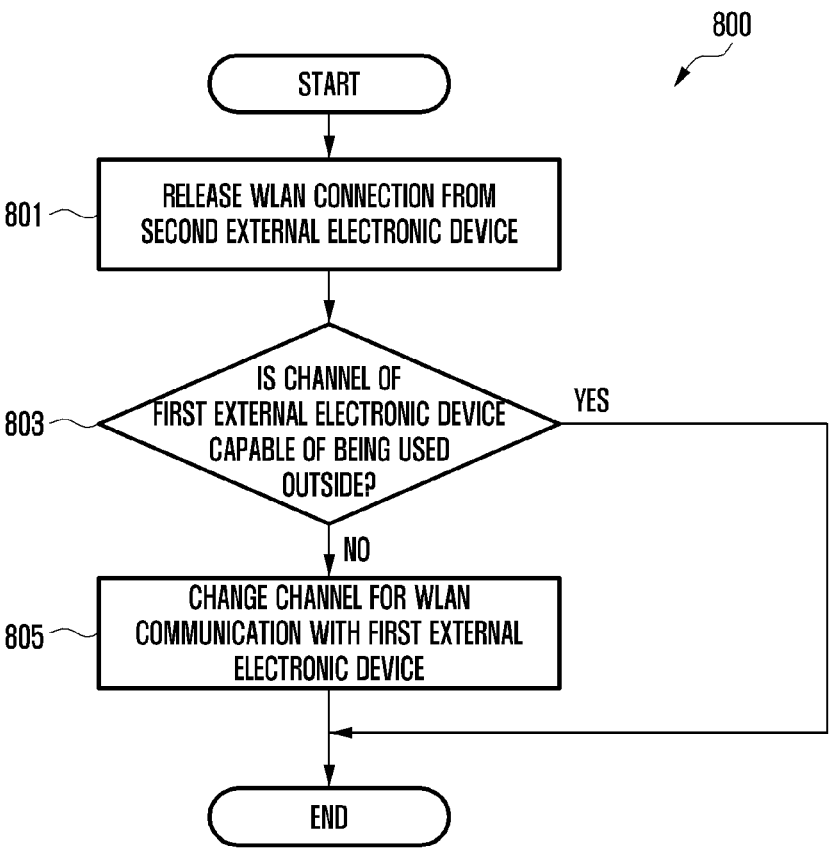
FIG. 8 is a flowchart illustrating an example of resetting of the frequency band of a first external electronic device, performed by an electronic device according to various embodiments.

FIG. 8 is a flowchart 800 illustrating an example of resetting of a frequency band of a first external electronic device, performed by an electronic device according to various embodiments. In an embodiment provided hereinafter, operations may be performed sequentially, but they are not necessarily performed sequentially. For example, the order of operations may be changed, and at least two operations may be performed in parallel. For example, the electronic device of FIG. 8 may be the electronic device 101 of FIG. 1, FIG. 2, or FIG. 3.

According to various embodiments with reference to FIG. 8, in the case in which WLAN communication with the first external electronic device 200 and the second external electronic device 210 is performed, the electronic device 101 or the processor (e.g., the processor 120 of FIG. 1 or the processor 300 of FIG. 3) may release a WLAN connection from the second external electronic device 210 in operation 801. According to an embodiment, in the case in which a communication connection to the AP 220 is released, the processor 300 may determine that a WLAN connection to the second external electronic device 210 is released.

According to various embodiments, the electronic device 101 or the processor (e.g., the processor 120 or 300) may identify whether a channel for WLAN communication with the first external electronic device 200 is capable of being used outside in operation 803. According to an embodiment, in the case in which the WLAN connection to the second external electronic device 210 is released, the processor 300 may determine that the electronic device 101 has moved outside. When it is determined that the electronic device 101 has moved outside, the processor 300 may determine whether a channel for WLAN communication with the first external electronic device 200 is capable of being used outside. For example, whether a channel for WLAN communication is capable of being used outside may be set for each channel.

According to various embodiments, when it is determined that the channel for WLAN communication with the first external electronic device 200 is capable of being used outside (e.g., 'Yes' in operation 803), the electronic device 101 or the processor (e.g., the processor 120 or 300) may terminate the operation to reset the frequency band of the first external electronic device. According to an embodiment, when it is determined that the channel for WLAN communication with the first external electronic device 200 is capable of being used outside, the processor 300 may control the first communication circuit 310 and/or the second communication circuit 320 so as to maintain use of the channel for WLAN communication with the first external electronic device 200.

According to various embodiments, when it is determined that the channel for WLAN communication with the first external electronic device 200 is incapable of being used outside (e.g., 'No' in operation 803), the electronic device 101 or the processor (e.g., the processor 120 or 300) may change the channel for WLAN communication with the first external electronic device 200 in operation 805. According to an embodiment, when it is determined that the use of the channel for WLAN communication with the first external electronic device 200 outside is restricted, the processor 300 may control the first communication circuit 310 and/or the second communication circuit 320 so as to change the channel for the wireless communication with the first external electronic device 200 to a channel that is capable of being used outside.

According to various embodiments, in the case in which the WLAN connection to the second external electronic device 210 is released, the electronic device 101 may change (or reset) a frequency band and/or channel for the WLAN communication with the first external electronic device 200 based on a change in the communication performance for the wireless communication with the first external electronic device 200 based on the release of the WLAN connection from the second external electronic device 210. According to an embodiment, in the case in which the WLAN connection to the second external electronic device 210 is released, the processor 300 may identify (or estimate) communication performance for the WLAN communication with the first external electronic device 200, which has been changed based on the release of the WLAN connection from the second external electronic device 210. When it is determined that the communication performance for WLAN communication with the first external electronic device 200, which has been changed based on the release of the WLAN connection from the second external electronic device 210, does not satisfy the designated reference performance, the processor 300 may control the first communication circuit 310 and/or the second communication circuit 320 so as to change the frequency band and/or channel for WLAN communication with the first external electronic device 200 to a frequency band and/or channel that satisfies the designated reference performance. For example, when it is determined that the quality of WLAN communication performed with the first external electronic device 200 via a first frequency band (e.g., an approximately 2.4 GHz band) or a second frequency band (e.g., an approximately 5 GHz band) does not satisfy the designated reference performance due to interference from surroundings, the processor 300 may control the first communication circuit 310 and/or second communication circuit 320 so as to change the channel for WLAN communication with the first external electronic device 200 to a channel of a third frequency band (e.g., an approximately 6 GHz band).

According to various embodiments, in the case in which the WLAN connection to the first external electronic device 210 that is performing WLAN-based direct communication is released, the electronic device 101 may perform WLAN communication with the first external electronic device 210 by changing the frequency band for the WLAN connection to the first external electronic device 210. According to an embodiment, in the case in which the WLAN connection to the first external electronic device 210 is released, the processor 300 may identify whether a frequency band (e.g., an approximately 5 GHz band and/or an approximately 2.4 GHz band) having coverage relatively wider than the coverage of a frequency band (e.g., an approximately 6 GHz band) used for the WLAN connection to the first external electronic device 210 is present. When it is determined that a frequency band having coverage relatively wider than the coverage of the frequency band used for the WLAN connection to the first external electronic device 210 is present, the processor 300 may control the first communication circuit 310 and/or the second communication circuit 320 so as to change the frequency band for WLAN connection to the first external electronic device 210 to a frequency band having relatively wide coverage. For example, the coverage of a frequency band may be an area (or a service area) in which the electronic device 101 is capable of performing data and/or signal transmission and/or reception with the first external electronic device 210 via the corresponding frequency band. For example, the release of the WLAN connection from the first external electronic device 210 may include the state in which the WLAN connection to the first external electronic device 210 is released without a user input related to the release of a WLAN connection and a WLAN connection release command from an application.

According to an embodiment, in the case in which the WLAN connection to the first external electronic device 210 is released, the processor 300 may control the first communication circuit 310 and/or the second communication circuit 320 so as to reattempt to perform WLAN connection to the first external electronic device 210. In the case in which the WLAN connection to the first external electronic device 210 is not restored during a designated period of time, the processor 300 may identify whether an external electronic device capable of performing direct communication with the electronic device 101 is present. For example, the processor 300 may proceed with BLE scan state 703 of FIG. 7. According to an embodiment, in the case in which a discovery request message of the first external electronic device 200 is received, the processor 300 may determine that direct communication with the first external electronic device 200 is available. Based on the frequency band used at a previous point in time for the WLAN communication with the first external electronic device 200, the processor 300 may control the first communication circuit 310 and/or the second communication circuit 320 so as to connect WLAN communication with the first external electronic device 200. In the case in which the connection of the WLAN communication with the first external electronic device 200 fails, the processor 300 may control the first communication circuit 310 and/or the second communication circuit 320 so as to connect WLAN communication with the first external electronic device 200 using another frequency band having coverage relatively wider than that of the frequency band used at a previous point in time for the WLAN communication with the first external electronic device 200.

According to an embodiment, in the case in which the frequency band for WLAN communication with the first external electronic device 200 is changed, the processor 300 may update (or reset) a frequency band for WLAN communication with the second external electronic device 210 based on the frequency band that has been changed for WLAN communication with the first external electronic device 200.

According to various embodiments, in the case in which the first external electronic device 200 capable of performing direct communication with the electronic device 101 is detected (e.g., operation 401 of FIG. 4 or operation 703 of FIG. 7) while a WLAN is being connected to the second external electronic device 210, the electronic device 101 may identify whether a channel for the WLAN communication with the second external electronic device 210 is capable of being used outside.

According to an embodiment, in the case in which a WLAN communication scheme that satisfies communication performance related to the WLAN communication of the electronic device 101 is the SCC scheme, the electronic device 101 may identify whether the channel for WLAN communication with the second external electronic device 210 is capable of being used outside. According to an embodiment, in the case in which the channel for WLAN communication with the second external electronic device 210 is not a channel capable of being used outside, the electronic device 101 may set (or reset) the frequency band and/or channel for the WLAN communication with the first external electronic device 200 as a channel capable of being used outside. According to an embodiment, the electronic device 101 may perform WLAN scanning related to the second external electronic device based on the frequency band and/or channel setting for the WLAN communication with the first external electronic device 200. Based on a WLAN scan result, the electronic device 101 may change an AP for the WLAN connection to the second external electronic device 210 or may perform cellular communication connection to the second external electronic device 210.

Figure 9:
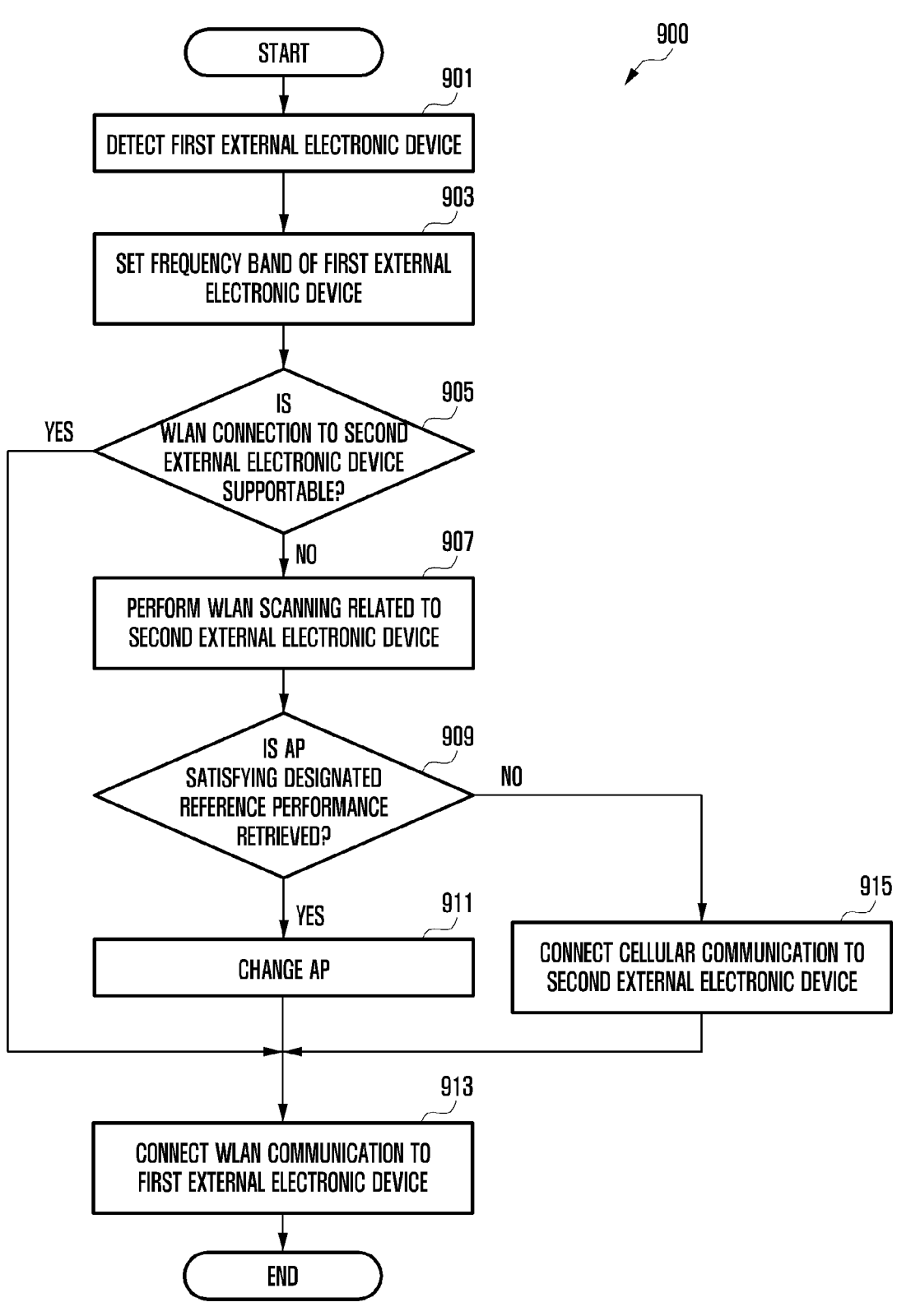
FIG. 9 is a flowchart illustrating example WLAN communication with a first external electronic device, performed by an electronic device according to various embodiments.

FIG. 9 is a flowchart 900 illustrating example WLAN communication with a first external electronic device, performed by an electronic device according to various embodiments. In an embodiment provided hereinafter, operations may be performed sequentially, but they are not necessarily performed sequentially. For example, the order of operations may be changed, and at least two operations may be performed in parallel. For example, the electronic device of FIG. 9 may be the electronic device 101 of FIG. 1, FIG. 2, or FIG. 3.

According to various embodiments with reference to FIG. 9, the electronic device 101 or a processor (e.g., the processor 120 of FIG. 1 or the processor 300 of FIG. 3) may detect the first external electronic device 200 connectable to the electronic device 101 via WLAN-based direct communication in operation 901. According to an embodiment, the processor 300 may identify whether the first external electronic device 200 is present that is connectable to the electronic device 101 via direct communication using short-range communication using the first communication circuit 310, the second communication circuit 320, and/or a separate short-range communication circuit (not illustrated). For example, the short-range communication may include NFC, Bluetooth, BLE, UWB and/or WLAN (e.g., Wi-Fi). According to an embodiment, the processor 300 may identify whether the first external electronic device 200 that is connectable to the electronic device 101 via direct communication is present via QR code recognition.

According to various embodiments, the electronic device 101 or the processor (e.g., the processor 120 or 300) may set a frequency band for WLAN communication with the first external electronic device 200 in operation 903. According to an embodiment, the processor 300 may set, as the frequency band for WLAN communication with the first external electronic device 200, a frequency band that satisfies communication performance that the first external electronic device 200 needs among WLAN frequency bands supportable by the electronic device 101.

According to various embodiments, the electronic device 101 or the processor (e.g., the processor 120 or 300) may identify whether WLAN communication with the second external electronic device 210 is supportable based on the frequency band for the WLAN communication with the first external electronic device 200 in operation 905. According to an embodiment, based on the frequency band for WLAN communication with the first external electronic device 200 and connection information related to WLAN communication with the second external electronic device 210, the processor 300 may estimate communication performance related to WLAN communication of the electronic device 101. For example, in the case in which the communication performance related to the WLAN communication of the electronic device 101 satisfies a designated reference performance, the processor 300 may determine that the WLAN communication with the second external electronic device 210 is supportable. For example, in the case in which the communication performance related to the WLAN communication of the electronic device 101 does not satisfy the designated reference performance, the processor 300 may determine that the WLAN communication with the second external electronic device 210 is not supportable.

According to various embodiments, when it is determined that WLAN communication with the second external electronic device 210 is supportable (e.g., 'Yes' in operation 905), the electronic device 101 or the processor (e.g., the processor 120 or 300) may perform WLAN communication with the first external electronic device 200 based on the frequency band for WLAN communication with the first external electronic device 200 in operation 913. According to an embodiment, the processor 300 may select a channel for WLAN communication with the first external electronic device 200 in the frequency band for WLAN communication with the first external electronic device 200. The processor 300 may control the first communication circuit 310 and/or the second communication circuit 320 so as to perform WLAN communication with the first external electronic device 200 via the channel for the WLAN communication with the first external electronic device 200. According to an embodiment, in the case of performing WLAN communication with the first external electronic device 200 and the second external electronic device 210, the processor 300 may control the first communication circuit 310 and/or the second communication circuit 320 so as to perform WLAN communication with the first external electronic device 200 and/or the second external electronic device 210 based on a WLAN communication scheme included in first connection information.

According to various embodiments, when it is determined that the WLAN communication with the second external electronic device 210 is not supportable (e.g., 'No' in operation 905), the electronic device 101 or the processor (e.g., the processor 120 or 300) may perform WLAN scanning related to the second external electronic device 210 in operation 907. According to an embodiment, the processor 300 may perform WLAN scanning in order to identify whether another AP is present that the electronic device 101 is capable of accessing for WLAN communication with the second external electronic device 210.

According to various embodiments, the electronic device 101 or the processor (e.g., the processor 120 or 300) may identify whether another AP that satisfies a designated reference performance is retrieved in operation 909. According to an embodiment, in the case in which another AP is not retrieved that the electronic device 101 is capable of accessing for WLAN communication with the second external electronic device 210, the processor 300 may determine that another AP that satisfies the designated reference performance is not retrieved. For example, another AP may include at least one other AP that the electronic device 101 is capable of accessing, excluding an AP that the electronic device 101 accesses for WLAN communication with the second external electronic device 210.

According to an embodiment, in the case in which another AP is retrieved that the electronic device 101 is capable of accessing for WLAN communication with the second external electronic device 210, the processor 300 may estimate, based on a frequency band for WLAN communication with the other AP, the communication performance of the electronic device 101 related to the frequency band for WLAN communication with the first external electronic device 200. In the case in which the communication performance of the electronic device 101 based on the frequency band for the WLAN communication with the first external electronic device 200 satisfies the designated reference performance, the processor 300 may determine that another AP that satisfies the designated reference performance is retrieved. For example, in the case in which the communication performance of the electronic device 101 based on the frequency band for the WLAN communication with the first external electronic device 200 does not satisfy the designated reference performance, the processor 300 may determine that another AP that satisfies the designated reference performance is not retrieved.

According to various embodiments, in the case in which another AP that satisfies the designate reference performance is retrieved (e.g., 'Yes' in operation 909), the electronic device 101 or the processor (e.g., the processor 120 or 300) may change an AP for WLAN communication with the second external electronic device 210 to the other AP that satisfies the designated reference performance in operation 911.

According to various embodiments, in the case in which another AP that satisfies the designate reference performance is not retrieved (e.g., 'No' in operation 909), the electronic device 101 or the processor (e.g., the processor 120 or 300) may change the wireless communication with the second external electronic device 210 to cellular communication in operation 915.

According to various embodiments, in the case in which the AP for the WLAN communication with the second external electronic device 210 is changed in operation 911 or in the case in which the wireless communication with the second external electronic device 210 to cellular communication in operation 915, the electronic device 101 or the processor (e.g., the processor 120 or 300) may perform WLAN communication with the first external electronic device 200 based on the frequency band for WLAN communication with the first external electronic device 200 in operation 913.

Figure 10:
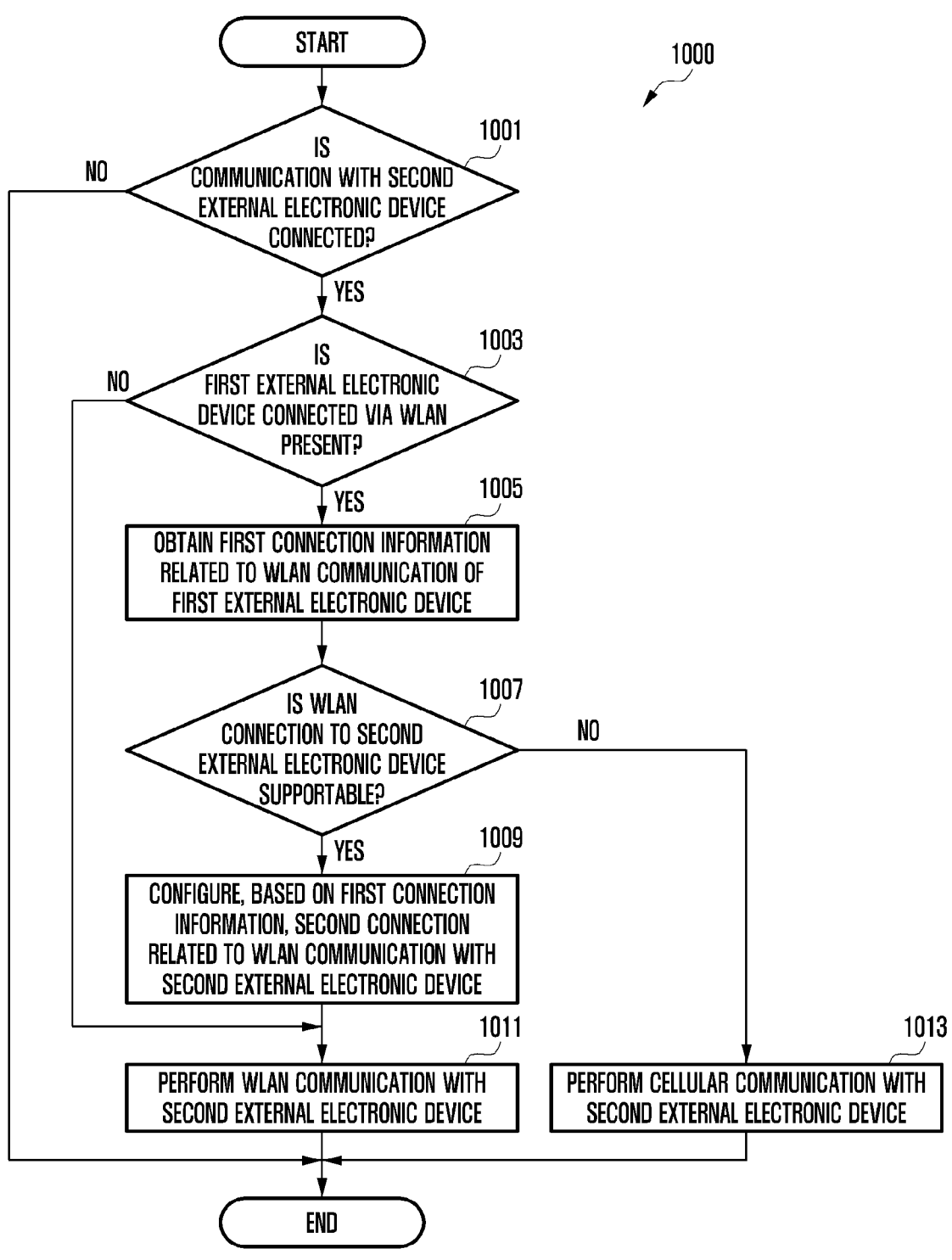
FIG. 10 is a flowchart illustrating example connection of communication with a second external electronic device, performed by an electronic device according to various embodiments.

FIG. 10 is a flowchart 1000 illustrating example wireless communication with a second external electronic device, performed by an electronic device according to various embodiments. In an embodiment provided hereinafter, operations may be performed sequentially, but they are not necessarily performed sequentially. For example, the order of operations may be changed, and at least two operations may be performed in parallel. For example, the electronic device of FIG. 10 may be the electronic device 101 of FIG. 1, FIG. 2, or FIG. 3.

According to various embodiments with reference to FIG. 10, the electronic device 101 or a processor (e.g., the processor 120 of FIG. 1 or the processor 300 of FIG. 3) may identify whether the second external electronic device 210 for wireless connection to the electronic device 101 based on WLAN communication is present in operation 1001. According to an embodiment, the processor 300 may identify whether the AP 220 that the electronic device 101 is capable of accessing is retrieved.

According to various embodiments, in the case in which the second external electronic device 210 for the wireless connection to the electronic device 101 based on WLAN communication is not present ('No' in operation 1001), the electronic device 101 or the processor (e.g., the processor 120 or 300) may terminate performing communication connection to the second external electronic device.

According to various embodiments, in the case in which the second external electronic device 210 for wireless connection to the electronic device 101 based on WLAN communication is present ('Yes' in operation 1001), the electronic device 101 or the processor (e.g., the processor 120 or 300) may identify whether the first external electronic device 200 is present that has a WLAN communication connection to the electronic device 101 in operation 1003.

According to various embodiments, when it is determined that the first external electronic device 200 that has a WLAN communication connection to the electronic device 101 is not present ('No' in operation 1003), the electronic device 101 or the processor (e.g., the processor 120 or 300) may perform WLAN communication with the second external electronic device 210 in operation 1011. According to an embodiment, in the case in which the first external electronic device 200 that is connected to the electronic device 101 via the WLAN communication is not present, the processor 300 may select a frequency band for WLAN communication with the second external electronic device 210 among frequency bands for WLAN communication supportable by the electronic device 101. The processor 300 may control the first communication circuit 310 and/or the second communication circuit 320 so as to access the AP 220 based on the frequency band for the WLAN communication with the second external electronic device 210.

According to various embodiments, when it is determined that the first external electronic device 200 that has a WLAN communication connection to the electronic device 101 is present ('Yes' in operation 1003), the electronic device 101 or the processor (e.g., the processor 120 or 300) may obtain first connection information related to WLAN communication with the first external electronic device 200 in operation 1005. For example, the first connection information related to WLAN communication with the first external electronic device 200 may include information associated with a frequency band for WLAN communication with the first external electronic device 200 and/or information related to a channel for the WLAN communication.

According to various embodiments, in operation 1007, the electronic device 101 or the processor (e.g., the processor 120 or 300) may identify whether WLAN communication with the second external electronic device 210 is supportable based on the frequency band for the WLAN communication with the first external electronic device 200. According to an embodiment, based on the frequency band for WLAN communication with the first external electronic device 200 and connection information related to WLAN communication with the second external electronic device 210, the processor 300 may estimate communication performance related to WLAN communication of the electronic device 101. For example, in the case in which the communication performance related to the WLAN communication of the electronic device 101 satisfies a designated reference performance, the processor 300 may determine that the WLAN communication with the second external electronic device 210 is supportable. For example, in the case in which the communication performance related to the WLAN communication of the electronic device 101 does not satisfy the designated reference performance, the processor 300 may determine that the WLAN communication with the second external electronic device 210 is not supportable.

According to various embodiments, when it is determined that WLAN communication with the second external electronic device 210 is supportable (e.g., 'Yes' in operation 1007), the electronic device 101 or the processor (e.g., the processor 120 or 300) may configure second connection information for the WLAN communication with the second external electronic device 210 based on the first connection information related to the WLAN communication with the first external electronic device 200 in operation 1009. According to an embodiment, based on the first connection information related to WLAN communication with the first external electronic device 200, the processor 300 may set a candidate frequency band for each WLAN communication scheme for WLAN communication with the second external electronic device 210. The processor 300 may set a candidate frequency band that satisfies communication performance related to WLAN communication of the electronic device 101 from among the candidate frequency bands of respective WLAN communication schemes, as a WLAN communication scheme and/or frequency band for wireless communication with the second external electronic device 210.

According to various embodiments, in operation 1011, the electronic device 101 or the processor (e.g., the processor 120 or 300) may perform WLAN communication with the second external electronic device 210 based on the second connection information for the WLAN communication with the second external electronic device 210. According to an embodiment, the processor 300 may select a channel for WLAN communication with the second external electronic device 210 in the frequency band for WLAN communication with the second external electronic device 210. The processor 300 may control the first communication circuit 310 and/or the second communication circuit 320 so as to access the AP 220 via a channel for the wireless communication with the second external electronic device 210.

According to various embodiments, when it is determined that the WLAN communication with the second external electronic device 210 is not supportable (e.g., 'No' in operation 1007), the electronic device 101 or the processor (e.g., the processor 120 or 300) may perform cellular communication with the second external electronic device 210 in operation 1013. According to an embodiment, the processor 300 may control the third communication circuit 330 to access the base station 230 for the cellular communication with the second external electronic device 210.

According to various embodiments, when it is determined that a candidate frequency band that satisfies communication performance related to the WLAN communication of the electronic device 101 is not present among the candidate frequency bands of respective WLAN communication schemes set based on the frequency band for WLAN communication with the first external electronic device 200, the electronic device 101 may perform wireless communication with the second external electronic device 210 based on cellular communication.

Figure 11:
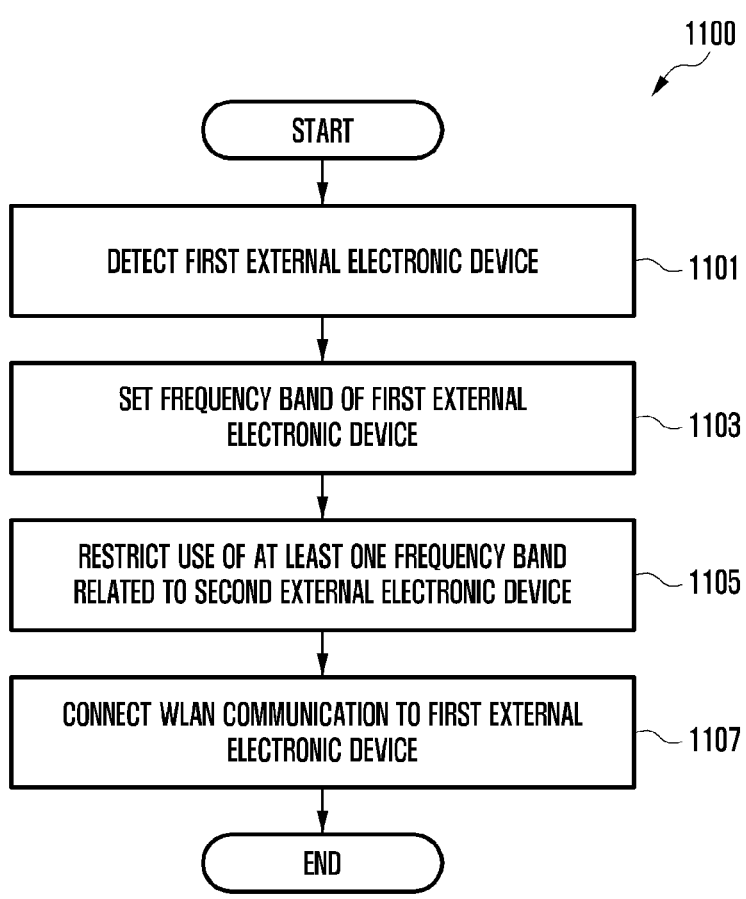
FIG. 11 is a flowchart illustrating example deactivation of a frequency band capable of being used for WLAN communication with a second external electronic device, performed by an electronic device according to various embodiments.

FIG. 11 is a flowchart 1100 illustrating an example of deactivation of a frequency band capable of being used for WLAN communication with a second external electronic device, performed by an electronic device according to various embodiments. In an embodiment provided hereinafter, operations may be performed sequentially, but they are not necessarily performed sequentially. For example, the order of operations may be changed, and at least two operations may be performed in parallel. For example, the electronic device of FIG. 11 may be the electronic device 101 of FIG. 1, FIG. 2, or FIG. 3.

According to various embodiments with reference to FIG. 11, the electronic device 101 or a processor (e.g., the processor 120 of FIG. 1 or the processor 300 of FIG. 3) may detect the first external electronic device 200 connectable to the electronic device 101 via WLAN-based direct communication in operation 1101. According to an embodiment, the processor 300 may identify whether the first external electronic device 200 is present that is connectable to the electronic device 101 via direct communication based on the first communication circuit 310, the second communication circuit 320, and/or a separate short-range communication circuit (not illustrated). For example, the short-range communication may include at least one of NFC, Bluetooth, BLE, UWB, or WLAN (e.g., Wi-Fi). According to an embodiment, the processor 300 may identify whether the first external electronic device 200 that is connectable to the electronic device 101 via direct communication is present via QR code recognition.

According to various embodiments, the electronic device 101 or the processor (e.g., the processor 120 or 300) may set a frequency band for WLAN communication with the first external electronic device 200 in operation 1103. According to an embodiment, the processor 300 may set, as the frequency band for WLAN communication with the first external electronic device 200, a frequency band that satisfies communication performance that the first external electronic device 200 needs among WLAN frequency bands supportable by the electronic device 101. For example, frequency bands of a WLAN supportable by the electronic device 101 may be identified based on a function (capability) related to the WLAN of the electronic device 101. According to an embodiment, based on the communication history of WLAN communication with the first external electronic device 200, the processor 300 may set the frequency band for WLAN communication with the first external electronic device 200. For example, the processor 300 may set a frequency band that the electronic device 101 used at a previous point in time for wireless communication with the first external electronic device 200, as the frequency band for WLAN communication with the first external electronic device 200.

According to various embodiments, in operation 1105, the electronic device 101 or the processor (e.g., the processor 120 or 300) may deactivate (e.g., restrict use of) at least one frequency band among a plurality of frequency bands available for the WLAN communication with the second external electronic device 210, based on the frequency band for the WLAN communication with the first external electronic device 200. For example, the deactivation of the frequency band may include a series of operations to restrict at least one of searching (or scan), measurement, or roaming performed on the deactivated frequency band. According to an embodiment, based on connection information (e.g., a frequency band) related to WLAN communication with the first external electronic device 200 and a WLAN communication scheme for WLAN communication with the second external electronic device 210, the processor 300 may identify (or select) at least one frequency band to be deactivated from among a plurality of frequency bands available for WLAN communication with the second external electronic device 210. The processor 300 may control the first communication circuit 310 and/or the second communication circuit 320 so as to restrict the at least one frequency band selected to be deactivated from being used for WLAN communication with the second external electronic device 210.

According to various embodiments, in operation 1107, the electronic device 101 or the processor (e.g., the processor 120 or 300) may perform WLAN communication with the first external electronic device 200 based on the frequency band for the WLAN communication with the first external electronic device 200.

According to various embodiments, in the case in which the frequency band that is being used for wireless communication with the second external electronic device 210 is deactivated, the electronic device 101 may update the connection information related to the WLAN communication with the second external electronic device 210. According to an embodiment, based on at least one frequency band that is not deactivated among the plurality of frequency bands available for the WLAN communication with the second external electronic device 210, the processor 300 may perform WLAN scanning in order to identify whether another AP is present that the electronic device 101 is capable of accessing for WLAN communication with the second external electronic device 210. According to an embodiment, in the case in which another AP is retrieved that the electronic device 101 is capable of accessing for WLAN communication with the second external electronic device 210, the processor 300 may control the first communication circuit 310 and/or the second communication circuit 320 so as to change an AP for WLAN communication with the second external electronic device 210 to the other AP retrieved via WLAN scanning According to an embodiment, in the case in which another AP that the electronic device 101 is capable of accessing for WLAN communication with the second external electronic device 210 is not retrieved, the processor 300 may control the first communication circuit 310, the second communication circuit 320, and/or the third communication circuit 330 so as to change the wireless communication with the second external electronic device 210 to cellular communication.

Figure 12:
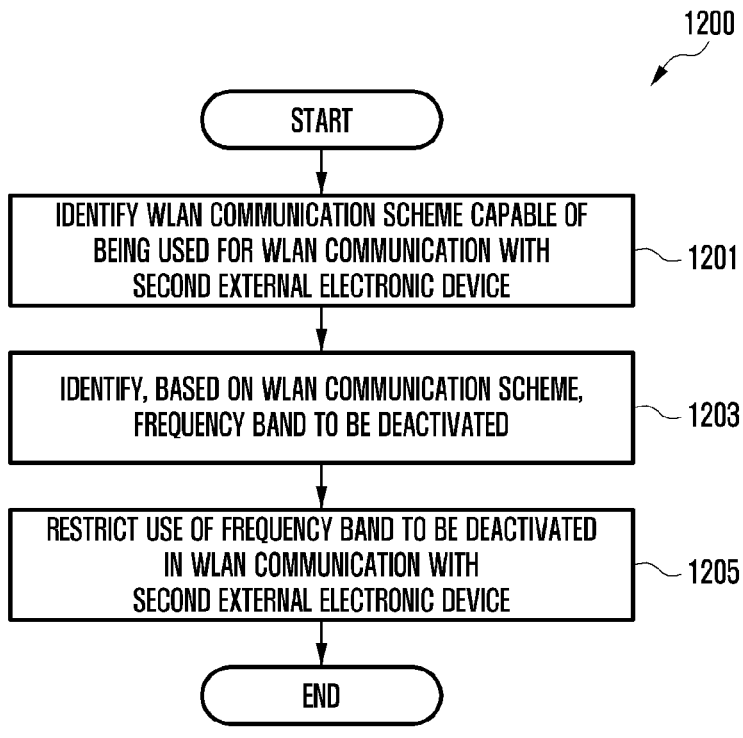
FIG. 12 is a flowchart illustrating an example of setting of a frequency band of which use is to be restricted in WLAN communication with a second external electronic device, performed by an electronic device according to various embodiments.

FIG. 12 is a flowchart 1200 illustrating an example of setting of a frequency band of which use is to be restricted for WLAN communication with a second external electronic device, performed by an electronic device according to various embodiments. According to an embodiment, at least a part of FIG. 12 may include detailed operations of operation 1105 of FIG. 11. In an embodiment provided hereinafter, operations may be performed sequentially, but they are not necessarily performed sequentially. For example, the order of operations may be changed, and at least two operations may be performed in parallel. For example, the electronic device of FIG. 12 may be the electronic device 101 of FIG. 1, FIG. 2, of FIG. 3.

According to various embodiments with reference to FIG. 12, in the case in which a frequency band for WLAN communication with the first external electronic device 200 is set (e.g., operation 1103 of FIG. 11), the electronic device 101 or the processor (e.g., the processor 120 of FIG. 1 or the processor 300 of FIG. 3) may identify a WLAN communication scheme capable of being used for WLAN communication with the second external electronic device 210 in operation 1201. According to an embodiment, based on at least one of the frequency band for WLAN communication with the first external electronic device 200, a function (capability) related to WLAN communication of the electronic device 101, or configuration information related to WLAN communication, the processor 300 may detect at least one WLAN communication scheme capable of being used for WLAN communication with the second external electronic device 210. For example, the configuration information related to the WLAN communication may include information related to at least one WLAN communication scheme that is configured, by the electronic device 101 based on a user input, so as to be capable of being used for WLAN communication.

According to various embodiments, in operation 1203, based on the frequency band for the WLAN communication with the first external electronic device 200 and the WLAN communication scheme for WLAN communication with the second external electronic device 210, the electronic device 101 or the processor (e.g., the processor 120 or 300) may identify (or select) at least one frequency band to be deactivated. According to an embodiment, in the case in which a third frequency band (e.g., approximately 6 GHz) for WLAN communication with the first external electronic device 200 is set, and an RSDB scheme for WLAN communication with the second external electronic device 210 is supported, the processor 300 may deactivate a second frequency band (e.g., approximately 5 GHz) and/or the third frequency band (e.g., approximately 6 GHz) among frequency bands capable of being used in the WLAN communication with the second external electronic device 210. For example, in the case in which the electronic device 101 supports the RSDB scheme related to the second frequency band (e.g., approximately 5 GHz) and the third frequency band (e.g., approximately 6 GHz), the processor 300 may deactivate the third frequency band (e.g., approximately 6 GHz) among frequency bands capable of being used for WLAN communication with the second external electronic device 210. For example, the RSDB scheme related to the second frequency band and the third frequency band may include a series of operations that simultaneously support the WLAN communication using the second frequency band and the WLAN communication using the third frequency band. For example, in the case in which the electronic device 101 supports only the first frequency band (e.g., approximately 2.4 GHz) and the second frequency band (e.g., approximately 5 GHz), and the RSDB scheme related to the first frequency band (e.g., approximately 2.4 GHz) and the third frequency band (e.g., approximately 6 GHz), the processor 300 may deactivate the second frequency band (e.g., approximately 5 GHz) and the third frequency band (e.g., approximately 6 GHz) among frequency bands capable of being used for WLAN communication with the second external electronic device 210. For example, the RSDB scheme related to the first frequency band and the second frequency band may include a series of operations in which an electronic device simultaneously supports the WLAN communication using the first frequency band and the WLAN communication using the second frequency band. For example, the RSDB scheme related to the first frequency band and the third frequency band may include a series of operations in which an electronic device simultaneously supports the WLAN communication using the first frequency band and the WLAN communication using the third frequency band.

According to an embodiment, in the case in which the third frequency band (e.g., approximately 6 GHz) for WLAN communication with the first external electronic device 200 is set, and an SCC scheme for WLAN communication with the second external electronic device 210 is supported, the processor 300 may deactivate other frequency bands remaining after excluding the third frequency band (e.g., approximately 6 GHz) from among the frequency bands capable of being used for the WLAN communication with the second external electronic device 210. For example, the other frequency bands remaining after excluding the third frequency band (e.g., approximately 6 GHz) may include the first frequency band (e.g., approximately 2.4 GHz) and/or the second frequency band (e.g., approximately 5 GHz).

According to various embodiments, the electronic device 101 or the processor (e.g., the processor 120 or 300) may restrict the use of at least one frequency band identified (or selected) to be deactivated in the WLAN communication with the second external electronic device 210 in operation 1205. For example, the deactivation of the frequency band may include a series of operations to restrict at least one of searching (or scan), measurement, or roaming performed on the deactivated frequency band.

According to various example embodiments, a method of operating the electronic device 101 or a processor (e.g., the electronic device 101 of FIG. 1, FIG. 2, or FIG. 3) may include: identifying whether a second external electronic device connected to the electronic device via WLAN for communication is present, based on a first external electronic device connectable to the electronic device via WLAN-based direction communication being retrieved, obtaining connection information related to WLAN communication with a second external electronic device, based on the second external electronic device connected via the WLAN for communication being present, setting a frequency band and/or WLAN communication scheme for WLAN communication with the first external electronic device based on the connection information related to the WLAN communication with the second external electronic device, and performing, based on the set WLAN communication scheme and/or frequency band, WLAN communication with the first external electronic device.

According to various example embodiments, the setting the frequency band and/or WLAN communication scheme may include: selecting, based on the connection information related to the WLAN communication with the second external electronic device, at least one WLAN communication scheme capable of being used for WLAN communication with the first external electronic device and a candidate frequency band related to each WLAN communication scheme, estimating the communication performance of a candidate frequency band related to the each WLAN communication scheme, and selecting, based on the estimated communication performance, a WLAN communication scheme and frequency band for WLAN communication with the first external electronic device.

According to various example embodiments, the selecting the candidate frequency band related to the WLAN communication scheme may include: selecting a candidate frequency band associated with each WLAN communication scheme and the WLAN communication scheme for a WLAN connection to the first external electronic device, based on a frequency band related to the WLAN communication with the second external electronic device.

According to various example embodiments, the selecting the WLAN communication scheme and frequency band may include: identifying a first service section related to a candidate frequency band of the each WLAN communication scheme, identifying a second service section for WLAN communication with the second external electronic device, identifying a candidate frequency band that satisfies a designated reference performance based on the first service section and the second service section, selecting the candidate frequency band that satisfies the designated reference performance as the frequency band for WLAN communication with the first external electronic device.

According to various example embodiments, the first service section may be set based on the bandwidth of the candidate frequency band of the each WLAN communication scheme and/or the amount of data needed for WLAN communication with the first external electronic device, and the second service section is set based on the bandwidth of a frequency band for WLAN communication with the second external electronic device and/or the amount of data needed for WLAN communication with the second external electronic device.

According to various example embodiments, the method may further include changing a wireless connection to the second external electronic device to a cellular network based on a candidate frequency band that satisfies the designated reference performance not being present.

According to various example embodiments, the method may further include: performing WLAN scanning related to the second external electronic device based on which a candidate frequency band that satisfies the designated reference performance not being present, identifying, based on a WLAN scan result, a candidate frequency band that satisfies the designated reference performance, and selecting the candidate frequency band that satisfies the designated reference performance as a frequency band for WLAN communication with the first external electronic device.

According to various example embodiments, the method may further include changing, based on the WLAN scan result, an access point (AP) for a wireless connection to the second external electronic device.

According to various example embodiments, the method may further include: changing a wireless connection to the second external electronic device to a cellular network based on a candidate frequency band that satisfies the designated reference performance being identified as not being present based on the WLAN scan result.

According to various example embodiments, the WLAN communication scheme may include at least one of real simultaneous dual band (RSDB), virtual simultaneous dual band (VSDB), or single channel concurrent (SCC).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   memory storing instructions;
   a wireless communication circuit configured to support a plurality of frequency bands related to a wireless local area network (WLAN) communication; and
   at least one processor, comprising processor circuitry, operatively connected to the memory and the wireless communication circuit,
   wherein the instructions, when executed by the at least one processor, individually and/or collectively, cause the electronic device to:
   identify a second external electronic device that is connected to the electronic device via the WLAN communication, when a first external electronic device connectable to the electronic device via WLAN-based direction communication is detected,
   obtain connection information related to the WLAN communication with the second external electronic device,
   select, based on the connection information related to the WLAN communication with the second external electronic device, at least one WLAN communication scheme usable for WLAN communication with the first external electronic device and a candidate frequency band related to each of the at least one WLAN communication scheme, determine a communication performance of the candidate frequency band related to each of the at least one WLAN communication scheme, when a candidate frequency band is identified to satisfy a designated reference performance, perform, based on the identified candidate frequency band, WLAN communication with the first external electronic device, when no candidate frequency band is identified to satisfy the designated reference performance:

change a wireless connection to the second external electronic device from the WLAN communication to a cellular network communication, and perform, based on change of the wireless connection to the second external electronic device, WLAN communication with the first external electronic device.

2. The electronic device of claim 1, wherein the instructions, when executed by the at least one processor, cause the electronic device to:

identify a first service section related to the candidate frequency band of the each of the at least one WLAN communication scheme, identify a second service section for WLAN communication with the second external electronic device, identify, based on the first service section and the second service section, a candidate frequency band that satisfies the designated reference performance, and select the candidate frequency band that satisfies the designated reference performance as the frequency band for WLAN communication with the first external electronic device.

3. The electronic device of claim 2, wherein the first service section is set based on a bandwidth of the candidate frequency band of the each of the at least one WLAN communication scheme and/or an amount of data needed for WLAN communication with the first external electronic device, and wherein the second service section is set based on a bandwidth of a frequency band for WLAN communication with the second external electronic device and/or an amount of data needed for WLAN communication with the second external electronic device.

4. The electronic device of claim 1, wherein the WLAN communication scheme comprises at least one of real simultaneous dual band (RSDB), virtual simultaneous dual band (VSDB), or single channel concurrent (SCC).

5. A method of operating an electronic device, the method comprising:

identifying a second external electronic device connected to the electronic device via wireless local area network (WLAN) communication, when a first external electronic device connectable to the electronic device via WLAN-based direction communication is detected;

obtaining connection information related to WLAN communication with the second external electronic device, when the second external electronic device is connected to the electronic device via the WLAN communication;

selecting, based on the connection information related to the WLAN communication with the second external electronic device, at least one WLAN communication scheme usable for WLAN communication with the first external electronic device and a candidate frequency band related to each of the at least one WLAN communication scheme;

determining a communication performance of the candidate frequency band related to each of the at least one WLAN communication scheme;

when a candidate frequency band is identified to satisfy a designated reference performance performing, based on the identified candidate frequency band, WLAN communication with the first external electronic device;

when no candidate frequency band is identified to satisfy the designated reference performance:

changing a wireless connection to the second external electronic device from the WLAN communication to a cellular network communication, and performing, based on change of the wireless connection to the second external electronic device, WLAN communication with the first external electronic device.

6. The method of claim 5, wherein the selecting of the WLAN communication scheme and frequency band comprises:

identifying a first service section related to a candidate frequency band of the each of the at least one WLAN communication scheme, identifying a second service section for WLAN communication with the second external electronic device, identifying, based on the first service section and the second service section, a candidate frequency band that satisfies the designated reference performance, and selecting the candidate frequency band that satisfies the designated reference performance as the frequency band for WLAN communication with the first external electronic device.

7. The method of claim 6, wherein the first service section is set based on a bandwidth of the candidate frequency band of the each of the at least one WLAN communication scheme and/or an amount of data needed for WLAN communication with the first external electronic device, and the second service section is set based on a bandwidth of a frequency band for WLAN communication with the second external electronic device and/or an amount of data needed for WLAN communication with the second external electronic device.

8. The method of claim 5, wherein the WLAN communication scheme comprises at least one of real simultaneous dual band (RSDB), virtual simultaneous dual band (VSDB), or single channel concurrent (SCC).

* * * * *